United States Patent
Yoshimura et al.

(10) Patent No.: US 7,413,496 B2
(45) Date of Patent: Aug. 19, 2008

(54) METHOD AND DEVICE FOR POLISHING ENDLESS BELT METAL RINGS FOR CONTINUOUSLY VARIABLE TRANSMISSION

(75) Inventors: Takeshi Yoshimura, Sayama (JP); Yoshiyuki Minowa, Sayama (JP); Tsutomu Maruyama, Sayama (JP); Seiichi Minegishi, Sayama (JP); Yasuo Watanabe, Sayama (JP); Yoshiharu Watabe, Sayama (JP); Fumitaka Haga, Sayama (JP); Katsuyuki Nakajima, Sayama (JP); Shinichi Kuriyama, Sayama (JP); Yuichi Nagao, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/544,985

(22) PCT Filed: Feb. 9, 2004

(86) PCT No.: PCT/JP2004/001331

§ 371 (c)(1),
(2), (4) Date: May 22, 2006

(87) PCT Pub. No.: WO2004/069473

PCT Pub. Date: Aug. 19, 2004

(65) Prior Publication Data

US 2006/0211343 A1    Sep. 21, 2006

(30) Foreign Application Priority Data

| Feb. 10, 2003 | (JP) | ............................. 2003-032248 |
| Jun. 30, 2003 | (JP) | ............................. 2003-186561 |
| Jun. 30, 2003 | (JP) | ............................. 2003-186562 |
| Jun. 30, 2003 | (JP) | ............................. 2003-186563 |
| Jun. 30, 2003 | (JP) | ............................. 2003-186564 |
| Jun. 30, 2003 | (JP) | ............................. 2003-186565 |
| Dec. 12, 2003 | (JP) | ............................. 2003-415392 |

(51) Int. Cl.
*B24B 9/00* (2006.01)
(52) U.S. Cl. ................................ 451/5; 451/51; 451/57
(58) Field of Classification Search .................. 451/51, 451/285, 59, 56, 57, 5, 10, 44
See application file for complete search history.

(56) References Cited

U.S. PATENT DOCUMENTS

| 4,078,905 A | * | 3/1978 | Oya ............................. 451/57 |
| 4,266,373 A | * | 5/1981 | Bornefeld et al. ........... 451/236 |
| 4,704,823 A | * | 11/1987 | Steinback .................... 451/261 |

FOREIGN PATENT DOCUMENTS

JM    2002-160034 A    6/2002

(Continued)

OTHER PUBLICATIONS

Microfilm of the specification and drawings annexed to the request of Japanese Utility Model Application No. 157356/1987 (Laid-open No. 60853/1989), Apr. 18, 1989.

*Primary Examiner*—Robert Rose
(74) *Attorney, Agent, or Firm*—Birch, Stewart, Kolasch & Birch, LLP

(57) ABSTRACT

There are disclosed a method and device for polishing a metal ring, which is capable of polishing a side edge of the metal ring without performing barrel polishing or polishing by grinding stones. Subsequently to a projecting step of projecting a metal ring W by clearing means 6, a first brush polishing step of polishing one edge of the metal ring W by a polishing brush 60 is performed. Subsequently, an inverting step of inverting the metal ring W whose one edge is polished by the first brush polishing step is inverted by the inverting means 10 is performed. Subsequently, a second brush polishing step of polishing the other edge of the metal ring W which is inverted by the inverting step by the polishing brush 60 is performed. Moreover, a clearing step of clearing the metal ring whose other edge is polished by the second brush polishing step by clearing means 7 is performed.

21 Claims, 21 Drawing Sheets

FOREIGN PATENT DOCUMENTS

| | | |
|---|---|---|
| JP | 60-23237 Y | 7/1985 |
| JP | 61-152359 A | 7/1986 |
| JP | 62-45832 A | 2/1987 |
| JP | 63-127849 A | 5/1988 |
| JP | 1-234134 A | 9/1989 |
| JP | 4-101760 A | 4/1992 |
| JP | 8-71900 A | 3/1996 |
| JP | 11-104942 A | 4/1999 |
| JP | 2000-153453 A | 6/2000 |
| JP | 2001-241512 A | 9/2001 |
| JP | 2002-103185 A | 4/2002 |
| JP | 2002-217149 A | 8/2002 |
| JP | 2002-248522 A | 9/2002 |
| SU | 1738611 * | 6/1992 |

* cited by examiner

METHOD AND DEVICE FOR POLISHING ENDLESS BELT METAL RINGS FOR CONTINUOUSLY VARIABLE TRANSMISSION

BACKGROUND OF THE INVENTION

1. Field of the Invention

The present invention relates to a method and device for polishing a thin-plate metal ring for use in an endless belt of a continuously variable transmission.

2. Description of the Related Art

For example, a plurality of elements stacked/arranged in an annular form and bound by a laminated ring constituted by stacking a plurality of metal rings have been used in a belt for power transmission for use in a continuously variable transmission. The metal ring constituting this type of laminated ring is formed in an endless band shape by slicing a cylindrical metal drum every predetermined width by a thin disc shaped grinding stone. Moreover, since burrs are generated in a side edge of the metal ring cut from the cylindrical drum, it is necessary o polish the burrs. Even when a few burrs are generated in the side edge of the metal ring, it is necessary to polish the side edge of the metal ring and to finish the side edge in a high-precision curved shape.

As a conventional method of polishing the side edge of the metal ring, a method described, for example, in Japanese Patent Laid-Open No. 2001-241512 is known. This polishing method of the metal ring is called barrel polishing, the metal rings which are works are mixed in a barrel filled with the grinding stones called media, and the barrel is rotated together with the metal rings and media. When the metal rings are stirred together with the media in the barrel in this manner, the media are brought into contact with the side edges of the metal rings to polish the side edges of the metal rings.

However, when the barrel polishing is performed, more media abut on an outer peripheral surface side rather than the inner side of the metal ring, and this causes a disadvantage that the polishing of inner and outer corners of the side edge of the metal ring becomes nonuniform. When the metal rings are projected into the barrel, and at the time of the barrel polishing, there is a possibility that the metal rings collide with one another and are scratched. These metal rings are removed by inspection, but have been causes for deterioration of yield.

On the other hand, in Japanese Patent Laid-Open No. 2002-248522, a method of polishing the side edge of the metal ring by the grinding stone is disclosed. However, for the polishing by the grinding stone, since a shape of the side edge of the metal ring is influenced by that of the grinding stone, it is frequently necessary to change the grinding stone, and there is a disadvantage that operation efficiency drops.

To solve the disadvantages, an object of the present invention is to provide a method and device for polishing a metal ring, in which a side edge of the metal ring can be polished without performing barrel polishing or polishing by a grinding stone to solve the above-described disadvantages.

SUMMARY OF THE INVENTION

To achieve the object, according to the present invention, there is provided a method of polishing a thin-plate cylindrical metal ring for use in an endless belt of a continuously variable transmission, comprising a projecting step of projecting the metal ring, a first brush polishing step of polishing one edge of the metal ring projected in the projecting step by a polishing brush, an inverting step of inverting the metal ring whose one edge is polished in the first brush polishing step, a second brush polishing step of polishing the other edge of the metal ring inverted in the inverting step by the polishing brush, and a clearing step of clearing the metal ring whose other edge is polished in the second brush polishing step.

According to the polishing method of the present invention, first, one edge of the metal ring is polished by the first brush polishing step. Subsequently, the metal ring is inverted by the inverting step, and the other edge of the metal ring is polished by the second brush polishing step. Since the side edge of the metal ring is polished by the polishing brush in the first and second brush polishing steps, different from the conventional barrel polishing, there is no possibility that grinding stones stick to the surface of the ring, and the ring can be polished with good precision. Additionally, since the inverting step is disposed, one edge and the other edge of the metal ring can efficiently be polished.

The method of the present invention is characterized in that in the first and second brush polishing steps, the metal ring is held substantially in a circular shape and rotated in a circumferential direction, further the polishing brush formed in an annular shape having a diameter larger than that of the metal ring to rotate is allowed to abut on the metal ring so as to cross the edge of the rotating metal ring, and the polishing brush crosses the edge of the rotating metal ring. At this time, the polishing brush enters the metal ring at a predetermined incidence angle with respect to a track of the rotating metal ring, passes between an inner peripheral surface of the metal ring and a rotation center of the metal ring, and leaves the metal ring at a predetermined outgoing angle with respect to the track of the metal ring.

At this time, the incidence angle and the outgoing angle are preferably 20° to 45°.

When the incidence angle and outgoing angle are less than 20°, a polishing amount of the side edge of the metal ring is reduced, and therefore a speed of the polishing brush has to be raised or a polishing time has to be lengthened. When the incidence angle is less than 20°, the polishing brush also abuts on the inner peripheral surface of the metal ring to polish the inner peripheral surface. On the other hand, when the incidence angle and outgoing angle exceed 45°, only a vertex of the side edge of the metal ring is polished, and satisfactory chamfering cannot be carried out. Therefore, when the incidence angle and outgoing angle of the polishing brush with respect to the metal ring are set to be 20° to 45°, the side edge of the metal ring can satisfactorily be chamfered.

Moreover, in the method of the present invention, the metal ring projected in the projecting step is formed by cutting out a thin plate cylindrical metal drum into round slices by a cut-out step disposed before the projecting step, and it is preferable to push/cut the metal drum with a cutter whose blade surface has a crow's foot shape in the cut-out step.

When the metal drum is cut by a thin disc shaped grinding stone to cut out the metal ring as in the related art, the side edge of the metal ring has a quadrangular shape, and therefore a shaving margin has to be increased in order to chamfer the side edge of the metal ring from this state. In the present invention, the metal ring is pushed/cut by a cutter whose blade surface has the crow's feet shape, therefore the shape of the cutter is transferred to the side edge of the metal ring and the metal ring is brought into a chamfered state. Therefore, the shaving margin can be reduced as compared with the side edge is cut by the grinding stone as in the related art.

Moreover, the method of the present invention is characterized in that in the first and second brush polishing steps, a load current value of a motor for rotating the polishing brush is detected, when the polishing brush abuts on the metal ring, and a cut-in amount of the polishing brush into the metal ring is increased or decreased so that the detected load current value is a load current value in a predetermined range.

In the first and second brush polishing steps, as a substitute characteristic of a motor rotation axis torque indicating a polishing force for controlling a polished shape, the cut-in amount of the polishing brush into the metal ring is increased or decreased in accordance with the load current value detected from the motor of the polishing brush. That is, when the polishing brush rotates while abutting on the side edge of the metal ring to perform the polishing, the motor of the polishing brush is loaded. The load on the motor is detected as the load current value of the motor. At this time, when the cut-in amount of the polishing brush into the metal ring is large, the load current value of the motor becomes large. When the cut-in amount is small, the load current value also becomes small. On the other hand, when the cut-in amount of the polishing brush into the metal ring is large, the polishing amount of the side edge of the metal ring by the polishing brush is large. When the cut-in amount is small, the polishing amount also becomes small. Therefore, with the large load current value of the motor, it can be confirmed that the polishing amount is large. When the load current value of the motor is small, it can be confirmed that the polishing amount is small. From this, the range of the load current value (the load current value in the predetermined range) from which a satisfactory polishing amount is obtained can be determined beforehand.

Moreover, for example, when the polishing brush is worn, the load current value of the motor decreases. Therefore, when the cut-in amount of the polishing brush into the metal ring is accordingly increased, a predetermined polishing amount can be obtained even with the worn polishing brush. When the cut-in amount of the polishing brush into the metal ring is increased or decreased so as to bring the load current value of the motor into a preset predetermined range in this manner, the predetermined polishing amount can be obtained without being influenced by a worn state of the polishing brush.

Moreover, in the present invention, prior to the first and second brush polishing steps, the method comprises a step of measuring a first current value of the motor, when the polishing brush is in a non-abutting state with respect to metal ring and the polishing brush is rotated, a step of measuring the polishing amount and a second current value of the motor, when the polishing brush is allowed to abut on the metal ring to polish the edge of the metal ring, a step of setting an increase of the second current value with respect to the first current value as the load current value to calculate a correlation between the load current value and the polishing amount, and a step of setting the load current value in the predetermined range in each brush polishing step based on the calculated correlation between the load current value and polishing amount.

The load current value of the motor can easily be obtained from the increase of the second current value with respect to the first current value. The range of the load current value at a time when the predetermined polishing amount is obtained can easily be obtained from the correlation between the load current value and polishing amount. When the range of the load current value obtained in this manner is set prior to each brush polishing step, the cut-in amount of the polishing brush into the metal ring can exactly be increased/decreased in accordance with the load current value in each brush polishing step.

Moreover, according to the present invention, there is provided an device for polishing a thin-plate cylindrical metal ring for use in an endless belt of a continuously variable transmission, comprising holding means for exposing one edge of the metal ring and detachably holding the metal ring to rotate the metal ring in a peripheral direction, and a polishing brush which is formed in an annular shape having a diameter larger than that of the metal ring and which abuts on the edge of the metal ring while rotating so as to cross the edge of the metal ring rotated by the holding means.

According to the device of the present invention, since the edge of the metal ring is polished by the polishing brush, there is not a possibility that grinding stones stick to a ring surface as in a conventional barrel polishing, and high-precision polish processing can efficiently be carried out.

Moreover, the device of the present invention comprises a holding table for detachably holding the metal ring while one edge of the ring is exposed, projecting means for projecting the metal ring into the holding table, first polishing means for polishing one edge of the metal ring held by the holding table by a polishing brush, inverting means for inverting the metal ring whose one edge is polished by the first polishing means and allowing the holding table to hold the metal ring while the other edge of the ring is exposed, second polishing means for polishing the other edge of the metal ring inverted by the inverting means and held by the holding table by the polishing brush, and clearing means for clearing the metal ring whose other edge is polished by the second polishing means from the holding table.

Since the metal ring is held by the holding table and polished by the polishing brushes of the first and second polishing means, the metal rings do not collide with each other as in the conventional barrel polishing, the metal rings are prevented from being damaged and the edges of the metal rings can be polished with good precision.

In the device of the present invention, the holding table includes holding means for detachably holding the metal ring to rotate the metal ring in the peripheral direction, each of the first and second polishing means includes the polishing brush formed in the annular shape having a diameter larger than that of the metal ring to rotate, and the polishing brush is allowed to abut on the metal ring so as to cross the edge of the metal ring rotated by the holding means.

Accordingly, the rotating polishing brush crosses and abuts on the metal ring. Additionally, when the polishing brush abuts on the metal ring, the metal ring is rotated in the peripheral direction by the holding means, and therefore the metal ring can efficiently be polished over the whole periphery by the polishing brush.

Moreover, in the device of the present invention, the holding table includes a plurality of the holding means arranged at predetermined intervals on the same circumference, and the polishing brush is formed in such a diameter that the polishing brush simultaneously abuts on the respective metal rings held by the holding means on the holding table.

Accordingly, since the plurality of metal rings can be held on the holding table, and the plurality of metal rings on the holding table can be polished by one polishing brush, an operation efficiency of the polishing can rapidly be enhanced.

Moreover, according to one mode in the device of the present invention, a plurality of the holding tables are arranged at predetermined intervals around a rotation axis of a turntable which intermittently rotates every predetermined angle, and the projecting means, the first polishing means, the inverting means, the second polishing means and the clearing means are successively arranged toward downstream from upstream along a rotation track of each holding table rotated by the turntable.

Accordingly, since the opposite edges of the metal ring are polished by one rotation of the turntable, the operation relating to the polishing can be performed with good efficiency, and further the device can be constituted to be compact.

Moreover, according to another mode in the device of the present invention, the device includes a first turntable including a plurality of holding tables arranged at the predetermined intervals around the rotation axis and intermittently rotating every predetermined angle, and a second turntable disposed adjacent to the first turntable and including a plurality of holding tables at the predetermined intervals around the rotation axis to intermittently rotate every predetermined angle. The projecting means and the first polishing means are successively arranged toward downstream from upstream along the rotation track of each holding table rotated by the first turntable. The second polishing means and the clearing means are successively arranged toward downstream from upstream along the rotation track of each holding table rotated by the second turntable. The inverting means inverts the metal ring on the holding table positioned in the downstream of the first polishing means of the first turntable, and transfers the metal ring onto the holding table positioned in the upstream of the first polishing means of the second turntable.

Accordingly, while the first turntable rotates once, one edge of the metal ring is polished. While the second turntable rotates once, the other edge of the metal ring is polished. Therefore, an operation interval per turntable can be relatively broadened, and, for example, a plurality of first polishing means can be disposed to enhance the polishing precision of the metal ring.

Moreover, as another mode of the device of the present invention, each of the projecting means, the first polishing means, the inverting means, the second polishing means and the clearing means includes the holding table, and transfer means is disposed between the holding tables disposed adjacent to each other to transfer the metal ring to the other holding table from one holding table.

Accordingly, when the transfer means transfers the metal ring to the other holding table from one holding table, the metal ring is removed from one holding table, and therefore other operations such as cleaning of the holding table from which the metal ring is removed can easily be inserted.

In this case, the projecting means, the first polishing means, the inverting means, the second polishing means and the clearing means are substantially linearly arranged.

Additionally, the holding table is circulated along an endless transfer path for intermittent transfer every predetermined distance, and the projecting means, the first polishing means, the inverting means, the second polishing means and the clearing means may successively be arranged toward downstream from upstream of each stop position of the holding table transferred by the transfer path.

Accordingly, the other operations such as the cleaning of the holding table from which the metal ring is removed can easily be inserted.

It is to be noted that in the present invention each of the first and second polishing means preferably includes: coarse polishing means for polishing the edge by a comparatively largely meshed polishing brush for rough processing; intermediate polishing means for polishing the edge by a polishing brush for intermediate processing finer than the polishing brush for coarse processing subsequently to the polishing by the coarse polishing means; and finish polishing means for polishing the edge by a polishing brush for finish processing finer than the polishing brush for intermediate processing subsequently to the polishing by the intermediate polishing means.

Accordingly, in the first polishing means, the coarse polishing, intermediate polishing, and finish polishing are carried out in order so that one edge of the metal ring can be polished with high precision. Also in the second polishing means, the coarse polishing, intermediate polishing, and finish polishing are carried out in order so that the other edge of the metal ring can be polished with high precision.

The holding table in the device of the present invention is capable of holding a plurality of metal rings. The projecting means comprises a transfer path for transferring the plurality of metal rings, an ascendible or descendible rise/fall table which is disposed on a terminal end of the transfer path and on which a forefront metal ring transferred along the transfer path is laid, a rotatable disc-shaped holding member disposed so as to be movable between the rise/fall table and the holding table while holding the plurality of metal rings, a predetermined number of housing sections which are arranged around the rotation axis of the holding member in accordance with a holding position of each metal ring of the holding table and which are formed in a diameter larger than that of the metal ring to house the metal ring, lifting means for lifting up the rise/fall table to house the metal ring in the housing section, when the holding member is positioned above the rise/fall table and any of the housing sections of the holding member is opposed to the metal ring on the rise/fall table, pressure contact holding means which is disposed in each housing section to pressure-contact an outer peripheral wall of the metal ring housed in the housing section and holds the metal ring in the housing section and which releases the pressure contact onto the outer peripheral wall of the metal ring in the holding position of the holding table, rotating means for rotating the holding member so as to dispose the non-housing housing section opposite to the metal ring on the rise/fall table after holding the metal ring in the housing section; and moving means for moving the holding member to the holding table from the rise/fall table after holding the metal ring in each housing section of the holding member.

When the metal ring of the transfer path is projected into the holding table by the projecting means, first the forefront metal ring is laid on the rise/fall table in the terminal end of the transfer path. On the other hand, the holding member is positioned above the rise/fall table. At this time, a state is assumed in which the metal ring on the rise/fall table is opposite to the housing section of the holding member. Subsequently, the rise/fall table is raised by the lifting means, and the metal ring is housed in the housing section of the holding member. At this time, the metal ring is held in the housing section by the pressure contact holding means disposed in the housing section. Subsequently, the rise/fall table is moved down, and the forefront metal ring is laid on the rise/fall table in the terminal end of the transfer path. Moreover, the holding means is rotated by the rotating means until the non-housing housing section (i.e., the housing section in which the metal ring is not housed) is positioned opposite to the metal ring on the rise/fall table, and the metal ring is transferred into the housing section by the raising of the rise/fall table in the same manner as described above. This can be repeated to house the metal rings into all the housing sections. Thereafter, the holding member moves onto the holding table by the transfer means, and the pressure contact of the pressure contact holding means of each housing section onto each metal ring is released. This releases the holding of each metal ring in the holding member, and the respective metal rings are simultaneously transferred onto the holding table.

In this manner, according to the present invention, after holding the metal ring in all of the housing sections of the holding member, the holding member is moved toward the holding table. Therefore, since the metal ring can be projected into the predetermined holding position of the holding table only one movement of the holding member for the transferring, a plurality of metal rings can efficiently be projected. Additionally, since the pressure contact holding means pressure-contacts the outer peripheral wall of the metal ring to hold the metal ring in each housing section of the holding member, a structure can be simplified and constituted to be compact as compared with conventional grasping means for grasping the metal ring.

Also in the projecting means, an even number of the housing sections are disposed in accordance with the holding position of each metal ring of the holding table in the holding member, and for the rise/fall table, one pair of metal rings are preferably laid on positions corresponding to any pair of housing sections of the holding member.

Accordingly, since the rings are transferred to the holding means from the rise/fall table every pair, the number of lifting/lowering operations of the rise/fall table and the number of stops of the holding member can be reduced, and efficiency can be enhanced.

Additionally, the rings are transferred to the even number of housing sections disposed in the holding member every pair. Therefore, when two columns of rings are only linearly transferred, two columns of forefront rings can be laid on the rise/fall table as they are. The rings can be transferred to one pair of housing sections from the rise/fall table with good efficiently without complicating the constitution of the rise/fall table.

Moreover, in the device of the present invention, the holding table includes holding means for detachably holding the metal ring and rotating the metal ring in the peripheral direction. The holding means includes: a laying base on which the metal ring is laid; a plurality of rails formed on the laying base so as to extend toward the inner surface of the metal ring from an axial center side of the metal ring laid on the laying base; a plurality of abutment members which are slidably disposed along each rail and which are capable of abutting on the inner surface of the metal ring laid on the laying base; and abutment member driving means for sliding the respective abutment members along the respective rails to attach or detach each abutment member with respect to the inner surface of the metal ring. The abutment member driving means comprises, a moving member capable of moving in a vertical direction along an axial center of the metal ring laid on the laying base, link means for connecting the moving member to each abutment member to attach each abutment member to the inner surface of the metal ring when the moving member moves upwards and to detach each abutment member from the inner surface of the metal ring when the moving member moves downwards, urging means for urging the moving member upwards to attach each abutment member to the inner peripheral surface of the metal ring via the link means by an urging force, and holding release means for moving the moving member downwards against the urging force of the urging means to detach each abutment member from the inner peripheral surface of the metal ring via the link means.

According to the holding means, since the plurality of rails are disposed on the laying base, and a plurality of abutment members sliding along the respective rails abut on the inner surface of the metal ring, the metal ring can be held with good precision. Moreover, since the holding means includes the abutment member driving means, the moving member is urged upwards by the urging means, each abutment member is attached to the inner peripheral surface of the ring via the link means, and therefore the high-precision holding state of the metal ring can securely be maintained.

When the metal ring held on the laying base is detached from the laying base, the moving member is moved downwards by the holding release means. Accordingly, the abutment member is slid into the metal ring by the link means. When the moving member is simply moved downwards in this manner, the respective abutment members are detached from the inner surfaces of the metal rings all at once, and the holding of the metal rings can be released remarkably quickly. Additionally, when the link means is simply disposed between the moving member and each abutment member, each abutment member can be driven to slide, the structure is therefore simple and the device can be constituted to be compact. When the metal ring is held on the non-laying laying base, the moving means is simply moved downwards by the holding release means in the same manner. Accordingly, the abutment members can approach each other. After laying the metal ring outside each abutment member, the urging force by the urging means is imparted to the moving means so that the metal ring can be held remarkably quickly.

Furthermore, a plurality of laying bases are arranged on the same circumference, and the holding release means includes another moving member disposed in a central position of the arrangement circumference of each laying base so as to be movable in the vertical direction, and a connecting member for connecting the other moving member to the moving member of each laying base. The moving member of each laying base is simultaneously moved downwards by the downward movement of the other moving member, and each abutment member of each laying base is simultaneously detached from the inner peripheral surface of the metal ring.

Accordingly, when the other moving member is moved downwards, the moving member of each laying base is simultaneously moved downwards via the connecting member. Therefore, even when a plurality of laying bases are arranged, each laying base can simultaneously hold and release the metal ring, and the holding operation can quickly be performed with respect to the plurality of metal rings with good efficiency.

Moreover, the inverting device in the device of the present invention includes a ring holding member which releasably holds the metal ring polished by the first polishing means and which is movable to a predetermined position, and moving means for inverting and moving the ring holding member holding the metal ring to the predetermined position. The ring holding member includes a ring holding hole which extends through an axial direction of the metal ring in accordance with an outer diameter of the metal ring and which houses the metal ring inside and which releasably holds the metal ring. The ring holding hole is characterized in that the metal ring is inserted via one opening and detached via the other opening.

When the metal ring is polished by the first brush polishing means, one edge of the metal ring is exposed upwards. For the metal ring whose one edge is polished in this state, the other edge not polished yet needs to be exposed upwards prior to the polishing by the second brush polishing means. Then, the inverting device holds the metal ring polished by the first brush polishing means is held by the ring holding member. The ring holding hole for housing and holding the metal ring is disposed in the ring holding member. At this time, the metal ring is inserted into the ring holding hole via one opening. At this time, since one edge of the metal ring polished by the first brush polishing means is exposed upwards, one polished edge of the metal ring is inserted through one opening of the ring holding hole directed downwards.

The ring holding member holding the metal ring in this manner is inverted and moved to the predetermined position by the moving means. Accordingly, the metal ring held by the ring holding member is inverted together with the ring holding member, and one polished edge is directed downwards. At this time, one opening of the ring holding hole directed downwards during the insertion of the metal ring is directed upwards, and simultaneously the other opening is directed downwards.

Moreover, the metal ring is detached from the other opening of the ring holding hole directed downwards. Accordingly, one polished edge of the metal ring is directed downwards and detached from the other opening of the ring holding hole, and the other non-polished edge of the metal ring released from the holding by the ring holding member is directed upwards.

In this manner, according to the present invention, the ring holding hole extending through the axial direction of the metal ring is disposed in the ring holding member, the metal ring is inserted via one opening of the ring holding hole, and the metal ring is detached from the other opening. Therefore, when the ring holding member is simply inverted, the metal ring can be inverted remarkably quickly.

At this time, the ring holding hole is formed in a diameter larger than that of the metal ring, and the pressure contact holding means for pressure-contacting the outer peripheral wall of the metal ring housed in the ring holding hole to releasably hold the metal ring is preferably disposed in the ring holding hole.

According to the pressure contact holding means, since the metal ring is held with the pressure contact in the ring holding hole, the metal ring can be held without obstructing the inserting/detaching of the metal ring with respect to each opening of the ring holding hole. Additionally, the metal ring is held in the ring holding hole by the pressure contact onto the outer peripheral wall by the pressure contact holding means in the ring holding hole. Therefore, even when the metal ring is easily deflected, the metal ring can securely be held substantially without deforming the metal ring.

Moreover, in the first and second polishing means, a plurality of metal rings are held in a predetermined arranged state to polish each metal ring, and the ring holding member is characterized in that a plurality of the ring holding holes are disposed in accordance with the arranged position of each metal ring of the first and second polishing means.

Accordingly, each ring holding hole can hold the metal ring while the predetermined arranged state in the first and second brush polishing devices is maintained, and therefore the plurality of metal rings can be inverted at once with good efficiency while maintaining the predetermined arranged state.

Moreover, in the device of the present invention, a dressing section for arranging bristles of the polishing brush can be disposed on the holding table positioned on the track of the polishing brush. Accordingly, while the polishing brush polishes the metal ring, the bristles are arranged by the dressing section. While the polishing operation is performed, the bristles of the polishing brush can be arranged without frequently detaching or changing the polishing brush for performing the dressing operation.

Furthermore, in the device of the present invention, the dressing section for arranging the bristles of the polishing brush can be disposed in an abutment position on the polishing brush in the holding means of the holding table. Accordingly, the dressing section abuts on the polishing brush while rotating. Therefore, friction between the polishing brush and the dressing section is comparatively large, and the bristles of the polishing brush can uniformly be arranged with good efficiently in a slight time for which the polishing brush passes on the ring holding means. Additionally, the rotating dressing section accordingly crosses the track of the polishing brush securely and can be attached to the polishing brush. Even when a space for disposing the dressing section is small, the dressing section is simply disposed in a part of the ring holding means, and the bristles of the polishing brush can uniformly be arranged securely.

DESCRIPTION OF THE PREFERRED EMBODIMENTS

Embodiments of the present invention will be described with reference to the drawings.

Figure 1:
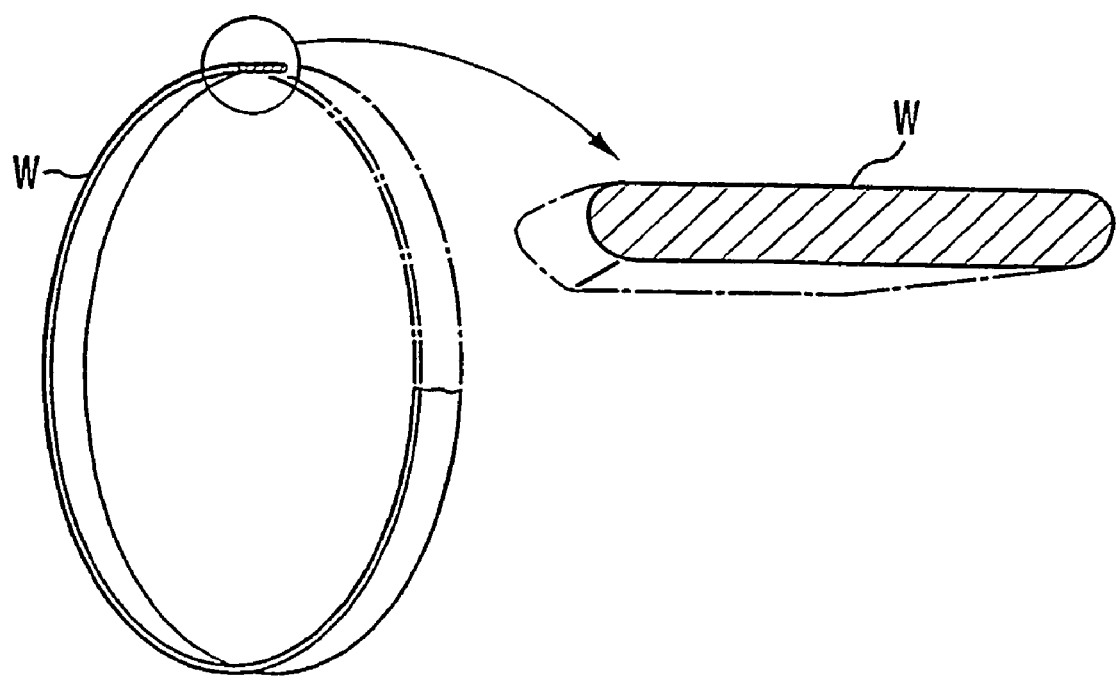
FIG. 1 is an explanatory view showing a metal ring whose opposite edges are polished in the present embodiment.

As shown in FIG. 1, a metal ring W is formed in a thin-plate endless band shape, and is used in an endless belt of a continuously variable transmission. For the sectional shape, as shown in an enlarged view of FIG. 1, opposite edges are polished substantially in a circular shape.

Figure 2:
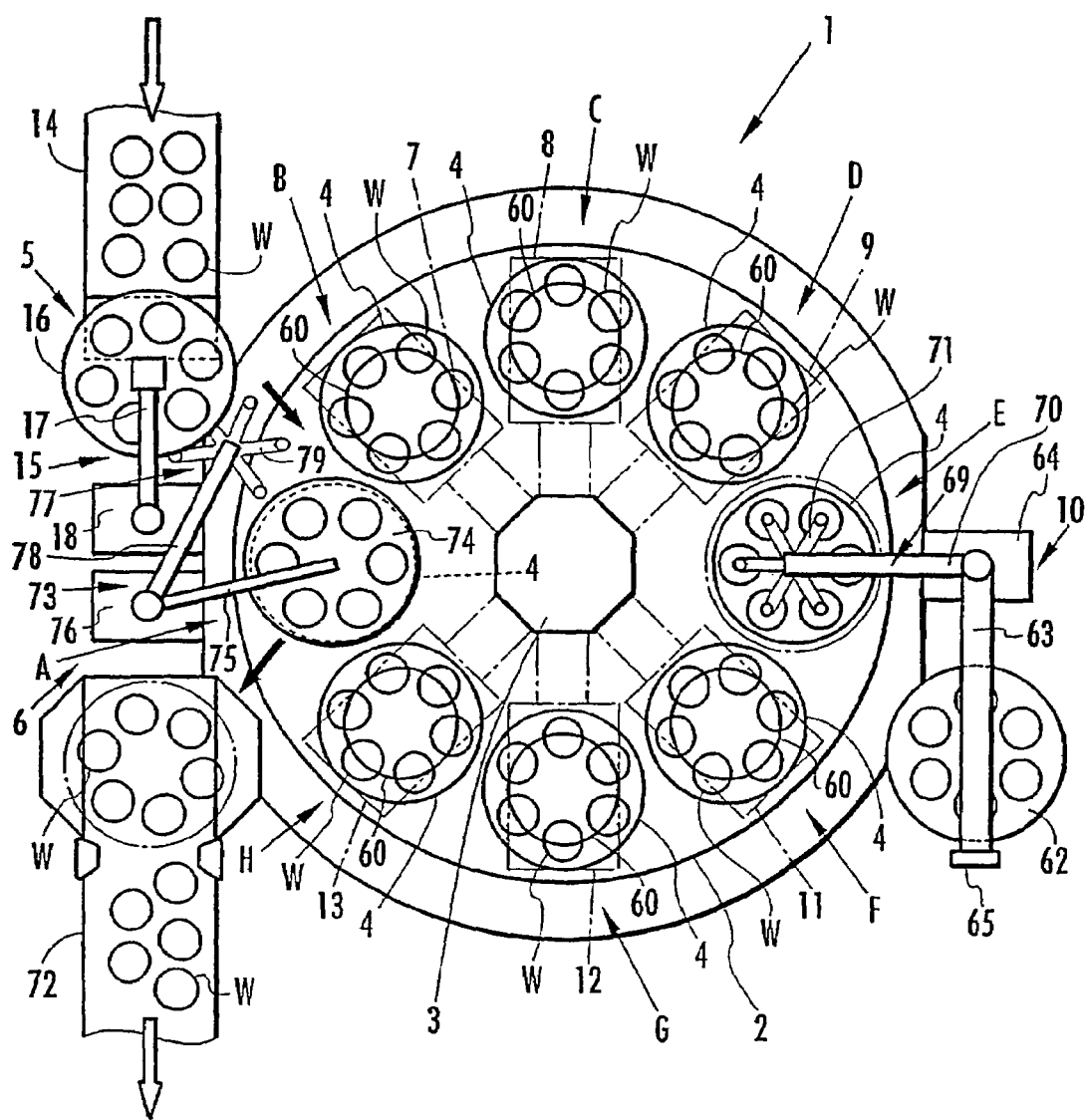
FIG. 2 is an explanatory view schematically showing a polishing device of a first embodiment of the present invention.

As shown in FIG. 2, a polishing device 1 in a first embodiment of the present invention includes a turntable 2 for transferring the metal rings W. The turntable 2 is intermittently rotated around a support 3, and a plurality of holding tables 4 (eight holding tables 4 in the present embodiment) are disposed at a predetermined interval on a peripheral edge of the turntable. The holding table 4 holds a plurality of metal rings W (six metal rings W in the present embodiment) while the rings are arranged on the same circumference.

For the turntable 2, the metal ring W on the holding table 4 is stopped for a predetermined time and afterwards rotated at a predetermined angle for each of eight stages A to H, and the metal ring W is transferred among the respective stages A to H. In a rotation direction of the turntable 2, the stage A positioned in an uppermost stream is a projecting/clearing stage, and the projecting/clearing stage A includes projecting means 5 and clearing means 6. The stage B disposed adjacent to the downstream of the projecting/clearing stage A is a first coarse polishing stage, and the first coarse polishing stage B includes first coarse polishing means 7. The stage C disposed adjacent to the downstream of the first coarse polishing stage B is a first intermediate polishing stage, and the first intermediate coarse polishing stage C includes first intermediate polishing means 8. The stage D disposed adjacent to the downstream of the first intermediate coarse polishing stage C is a first finish polishing stage, and the first finish coarse polishing stage D includes first finish polishing means 9. The first coarse polishing means 7, first intermediate polishing means 8, and first finish polishing means 9 constitute first polishing means of the present invention for polishing first edge of the metal ring W.

The stage E is an inverting stage disposed adjacent to the downstream of the first finish polishing stage D, and the inverting stage E includes inverting means 10. Furthermore, the stage F disposed adjacent to the downstream of the inverting stage E is a second coarse polishing stage, and the second coarse polishing stage F includes second coarse polishing means 11. The stage G disposed adjacent to the downstream of the second coarse polishing stage F is a second intermediate polishing stage, and the second intermediate coarse polishing stage G includes second intermediate polishing means 12. The stage H disposed adjacent to the downstream of the second intermediate polishing stage G is a second finish polishing stage, and the second finish polishing stage H includes second finish polishing means 13. The second coarse polishing means 11, second intermediate polishing means 12, and second finish polishing means 13 constitute second polishing means of the present invention for polishing the other edge of the metal ring W.

Next, each component will be described in detail. As shown in FIG. 2, the projecting means 5 is constituted by a projecting/transporting conveyor 14 for conveying a plurality of metal rings W in a projecting direction, and transfer means for projection 15 for holding the metal ring W of the projecting/transporting conveyor 14 to transfer the metal ring W to the holding table 4 positioned in the projecting/clearing stage A. The transfer means for projection 15 includes: a holding member for projection 16 for holding a plurality of metal rings W in a state corresponding to a holding position of the metal ring W of the holding table 4; a transfer arm 17 for moving the holding member for projection 16 to the holding table 4 positioned in the projecting/clearing stage A from the projecting/transporting conveyor 14; and arm driving means 18 for driving the transfer arm 17 so as to rock in horizontal and vertical directions. It is to be noted that although not shown, the transfer arm 17 is constituted to constantly maintain the holding member for projection 16 in a horizontal state even when rocking the arm in the horizontal and vertical directions.

Figure 3:
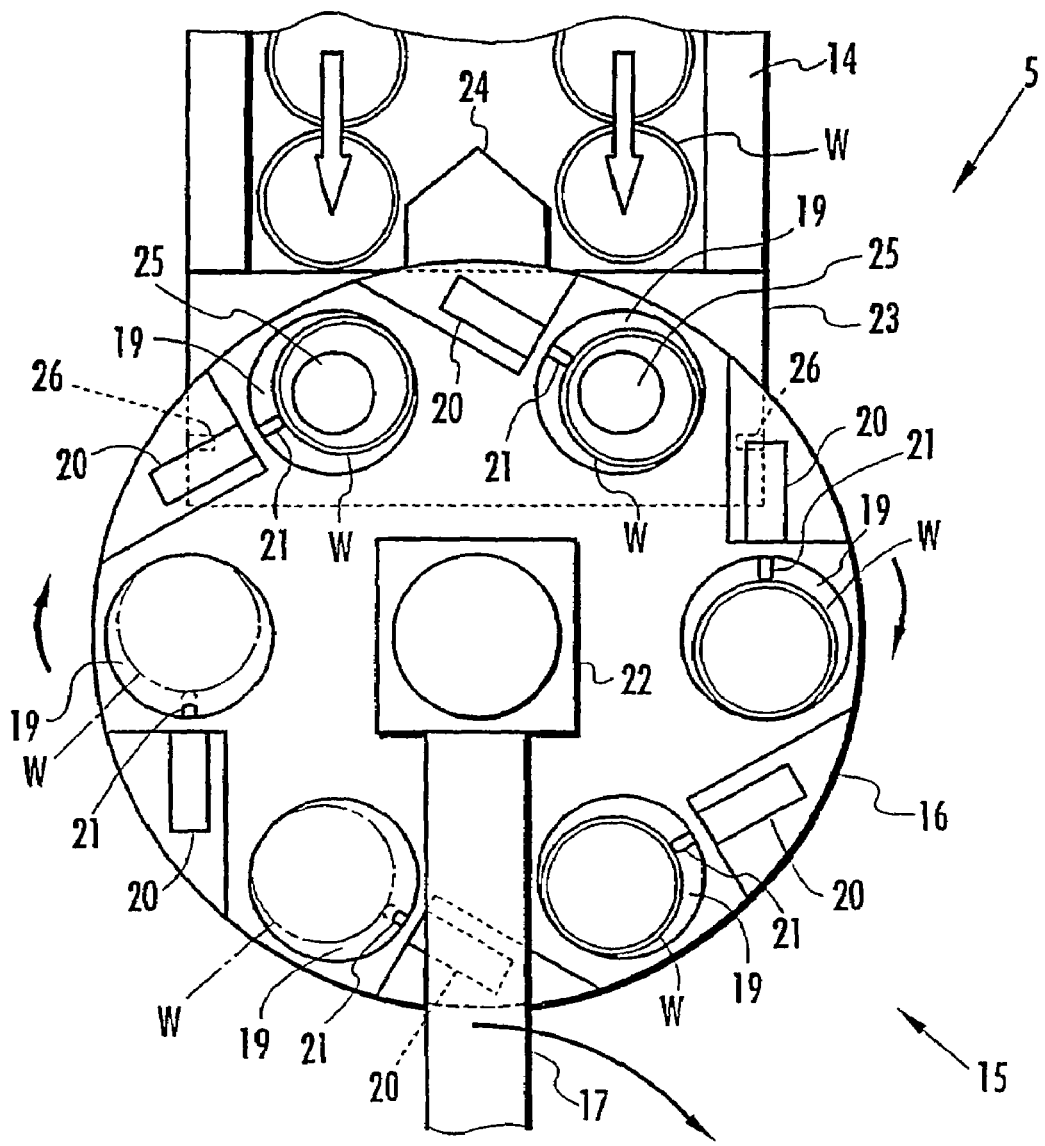
FIG. 3 is an explanatory plan view showing a holding member for projection of projecting means.

As shown in FIG. 3, the holding member for projection 16 includes a plurality of holding holes 19 formed at predetermined intervals on the same circumference. The respective holding holes 19 are disposed in six positions in the present embodiment in accordance with the holding positions of the metal rings W in the holding table 4. Furthermore, an inner diameter of each holding hole 19 is formed to be larger than an outer diameter of the metal ring W. The holding member for projection 16 includes a plurality of cylinders 20 for the respective holding holes 19, and piston rods 21 extended/contracted by the respective cylinders 20 protrude into the respective holding holes 19. The metal ring W housed in each holding hole 19 pressure-contacts an inner peripheral wall of each holding hole 19 and is held in each holding hole 19 by the extension of the piston rod 21. The holding member for projection 16 includes a motor for rotation 22 rotatably connected to a tip of the transfer arm 17 to intermittently rotate the arm every predetermined angle.

Figure 4:
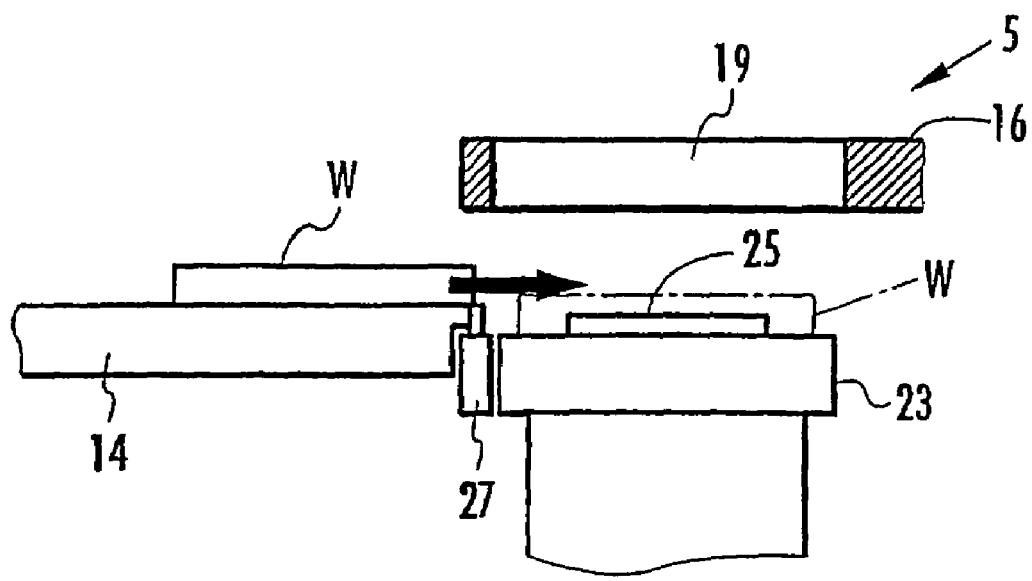
FIG. 4 is an explanatory view showing an operation of the projecting means.
Figure 4:
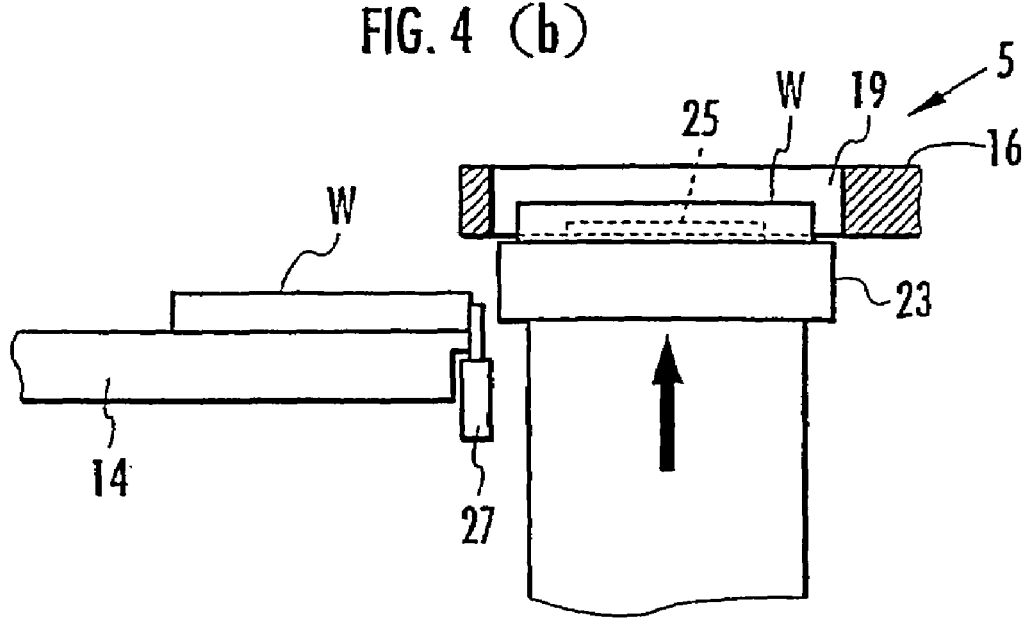

On the other hand, as shown in FIG. 3, a rise/fall table 23 is disposed in a terminal end of the projecting/transporting conveyor 14. The rise/fall table 23 holds one pair of metal rings W aligned in two columns by an alignment section 24 disposed in a terminal end portion of the projecting/transporting conveyor 14 and conveyed to the terminal end of the projecting/transporting conveyor 14, and is lifted up/down by lifting means (not shown). The rise/fall table 23 includes a holding convex portion 25 having a diameter smaller than the inner diameter of the metal ring W, and a sensor 26 for sensing the metal ring W held by the holding convex portion 25. When the metal ring W is sensed by the sensor 26, the rise/fall table 23 is raised by the lifting means. Furthermore, as shown in FIG. 4(*a*), a stopper 27 protruding downwards from a bottom portion of the projecting/transporting conveyor 14 is disposed in the terminal end of the projecting/transporting conveyor 14. The stopper 27 engages with the metal ring W positioned in the terminal end of the projecting/transporting conveyor 14 at the time of the sensing of the metal ring W by the sensor 26 to stop the advancing of the metal ring W.

When the metal ring W is projected into the holding table 4 of the turntable 2 by the projecting means 5, first, as shown in FIG. 4(*a*), the holding member for projection 16 is position right above the rise/fall table 23. At this time, as shown in FIG. 3, one pair of holding convex portions 25 of the rise/fall table 23 are opposed to any pair of holding holes 19 adjacent to each other among the respective holding holes 19 of the holding member for projection 16. Subsequently, when the metal ring W is held by one pair of holding convex portions 25, the rise/fall table 23 rises by the sensing of the sensor 26, and, as shown in FIG. 4(*b*), the metal ring W of one pair of holding convex portions 25 is housed in one pair of holding holes 19 of the holding member for projection 16. At this time, as shown in FIG. 3, the cylinders 20 of both the holding holes 19 operate, the piston rods 21 abut on the metal ring W, the metal ring W is held in both the holding holes 19, and then the rise/fall table 23 is moved downwards. Thereafter, the holding member for projection 16 is rotated at a predetermined angle by the motor for rotation 22, and one pair of metal rings W are transferred by the moving up/down of the rise/fall table 23 shown in FIGS. 4(a) and 4(b). Similarly, one pair of metal rings W are transferred by the rotating of the holding member for projection 16 and the moving up/down of the rise/fall table 23, and accordingly the metal rings W are held in all the holding holes 19 of the holding member for projection 16.

In this manner, even when the holding member for projection 16 includes six holding holes 19, the metal rings W can be held in all of the holding holes 19 of the holding member for projection 16 by three transfers for each of one pair of metal rings W, and therefore a plurality of metal rings W can be held in the holding member for projection 16 with good efficiency in a short time.

Thereafter, referring to FIG. 2, the transfer arm 17 rocks in the horizontal direction toward the holding table 4 positioned in the projecting/clearing stage A, and further the transfer arm 17 rocks downwards to transfer the metal ring W to the holding table 4 from the holding member for projection 16.

Figure 5:
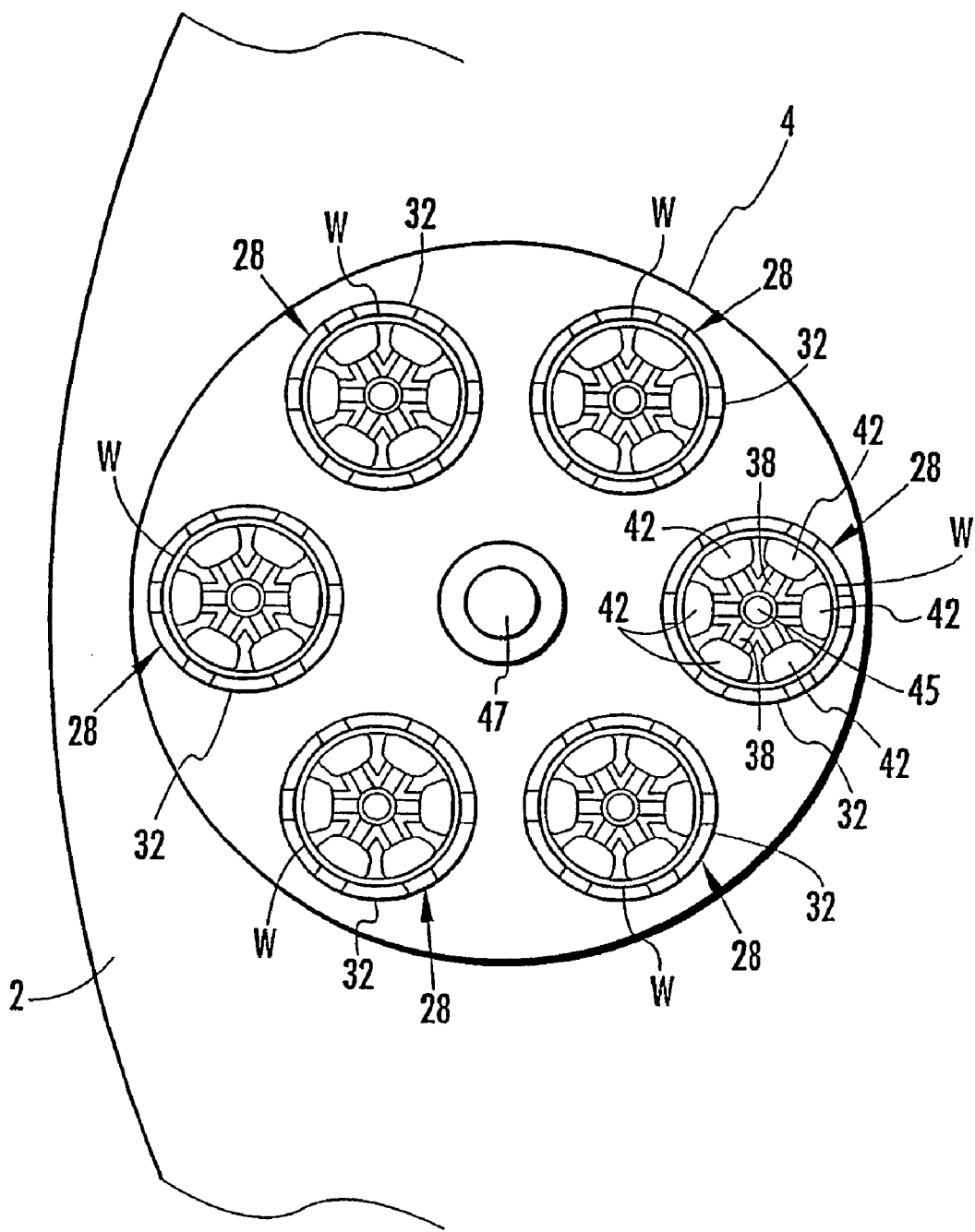
FIG. 5 is an explanatory plan view of a holding table.
Figure 6:
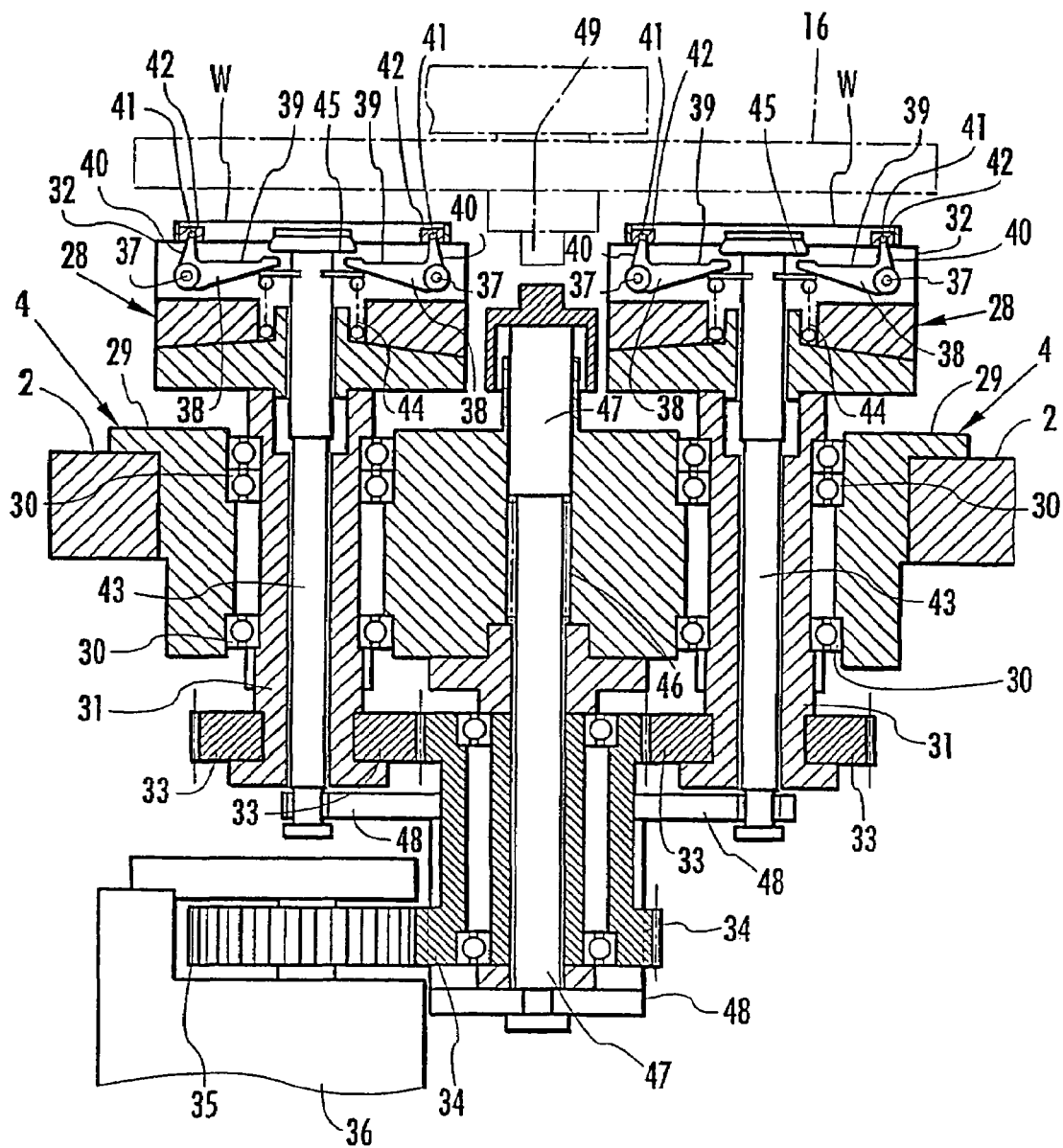
FIG. 6 is an explanatory longitudinal sectional view of the holding table.

Next, a constitution of the holding table 4 will be described in detail. As shown in FIG. 5, the holding table 4 includes a plurality of (six) holding means 28 arranged at predetermined intervals on the same circumference in accordance with the holding positions of the respective metal rings W. The holding means 28 are constituted to rotatably hold the metal ring W from the inside. That is, as shown in FIG. 6, the holding means 28 includes: a cylindrical rotation axis 31 rotatably supported by a frame 29 of the holding table 4 fixed to the turntable 2 via a plurality of bearings 30; and a rotation base 32 which is connected to an upper portion of the rotation axis 31 and on which the metal ring W is laid.

The rotation axis 31 includes a driven gear 33 on its lower end, and the driven gear 33 is rotated by a driving motor 36 via an intermediate gear 34 and a driving gear 35. It is to be noted that the driving motors 36 are disposed respectively in the above-described stages B, C, D, F, G, H, and are not disposed in the projecting/clearing stage A and inverting stage E.

Figure 7:
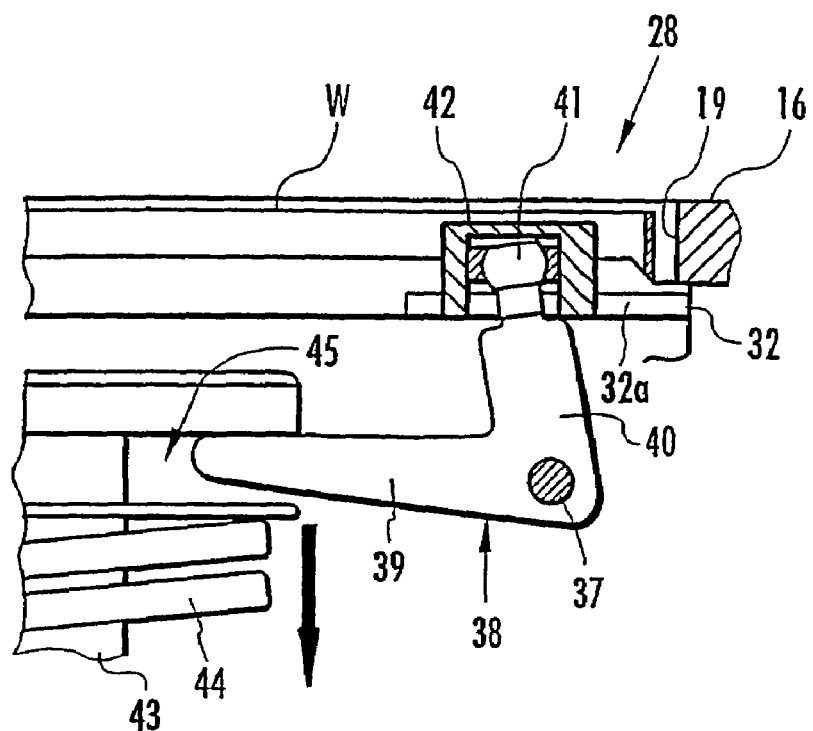
FIG. 7 is an explanatory view showing an operation of holding means of the holding table.
Figure 7:
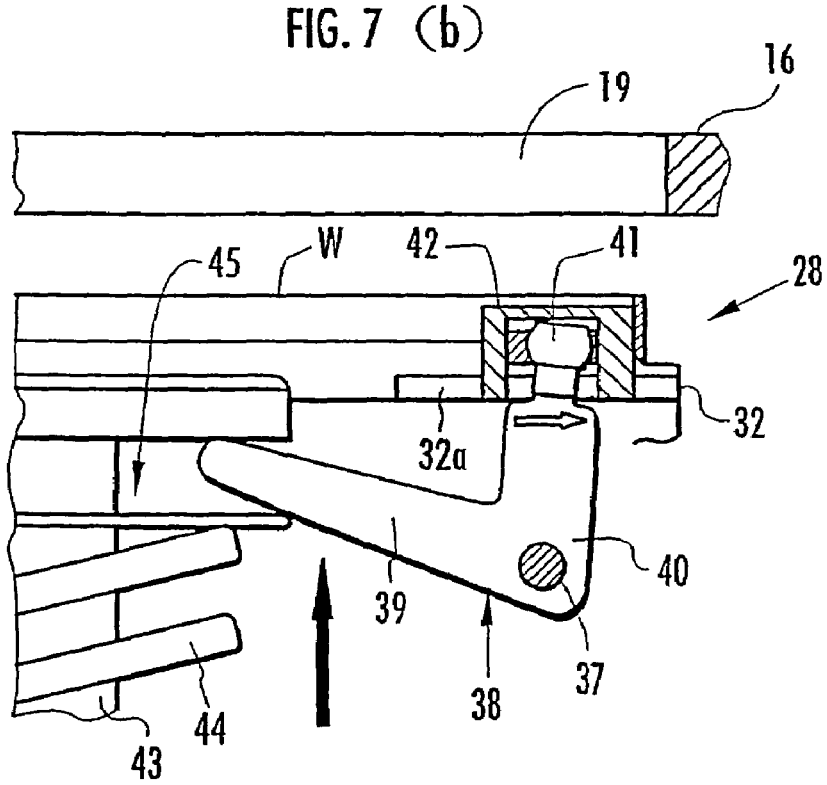

Moreover, a plurality of rocking members 38 rockably supported via support shafts 37 are radially arranged on the rotation base 32. The rocking member 38 includes a first extending portion 39 extending in a diametric direction of the rotation base 32, and a second extending portion 40 integrally connected to the first extending portion 39 and bent via the support shaft 37 to extend upwards. An upper end of the second extending portion 40 is connected to an abutment member 42 via a connecting portion 41 (see FIG. 7). The respective abutment members 42 are radially slidably arranged along a plurality of rails 32a (see FIG. 7) formed on the rotation base 32, and slide outwards from the rotation base 32 by the rocking of the rocking member 38 so that the outer surface of the rail abuts on the inner peripheral surface of the metal ring W. The rocking members 38 constitute link means of the present invention.

Furthermore, a first sliding shaft 43 slidable in the vertical direction along an axial line is inserted/held in the rotation axis 31 and rotation base 32. The first sliding shaft 43 is urged upwards by a spring 44. A holding portion 45 for holding the end of the first extending portion 39 of the rocking member 38 is disposed on the upper end of the first sliding shaft 43. Moreover, a second sliding shaft 47 urged upwards by a spring 46 is held in a central portion of each holding means 28. The second sliding shaft 47 is connected to a lower end of each first sliding shaft 43 via a connecting member 48 disposed in the lower end of the second sliding shaft.

An operation of each holding means 28 will be described. As shown by a virtual line in FIG. 6, when a pressing protrusion 49 disposed on a middle portion of the holding member for projection 16 presses the second sliding shaft 47, the second sliding shaft 47 moves downwards. Accordingly, each first sliding shaft 43 slides downwards via the connecting member 48. At this time, as shown in FIG. 7(a), the holding portion 45 moves downwards to push downwards the first extending portion 39 of each rocking member 38. Accordingly, with the rocking of the second extending portion 40 of each rocking member 38, each abutment member 42 slides toward the middle of the rotation base 32. When the metal ring W held in each holding hole 19 of the holding member for projection 16 is laid on the rotation base 32 in this state, each abutment member 42 enters the metal ring W. Next, referring to FIG. 6, when the holding of the metal ring W by each holding hole 19 of the holding member for projection 16 is released, and the holding member for projection 16 moves upwards, the pressing of the second sliding shaft 47 by the pressing protrusion 49 is released. Accordingly, the second sliding shaft 47 is urged by the spring 46 to slide upwards, and the depressing of the first sliding shaft 43 is released. Moreover, as shown in FIG. 7(b), when the first sliding shaft 43 is urged by the spring 44 to push upwards the holding portion 45, each rocking member 38 rocks, and each abutment member 42 slides along the rail 32a to abut on the inside of the metal ring W. In this manner, in accordance with the present embodiment, with the moving up/down of the holding member for projection 16, a plurality of metal rings W are held by each abutment member 42, and a plurality of metal rings W can be held on the holding table 4 quickly with good efficiency.

Figure 8:
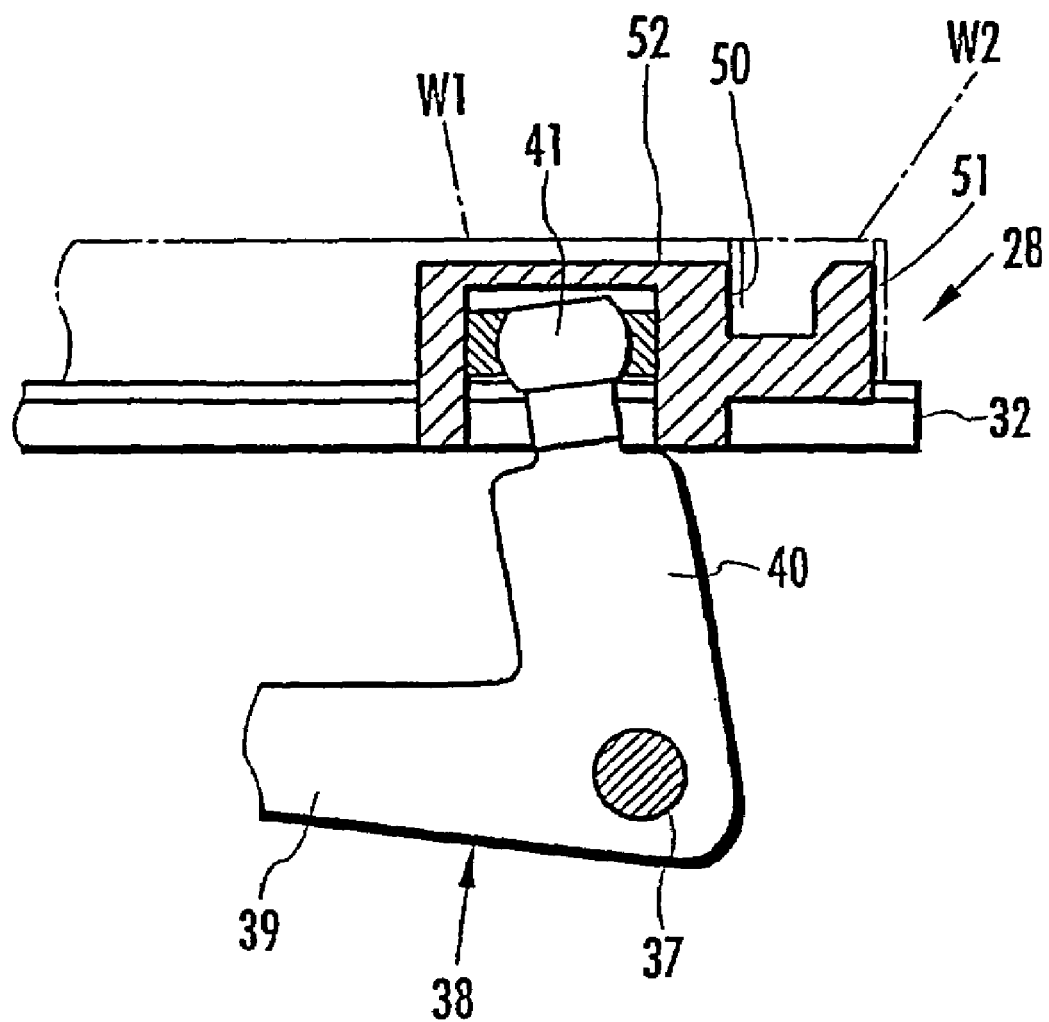
FIG. 8 is an explanatory view showing another example of the holding means of the holding table.

Here, as shown in FIGS. 7(a) and 7(b), when a sliding distance toward a peripheral edge side from a central side of the rotation base 32 is set to be comparatively large, the abutment member 42 is capable of holding even the metal ring W having a small or large diameter. Accordingly, when receiving the metal ring W, the respective abutment members 42 gathered on the center of the rotation base 32 need to be formed to be comparatively small. Therefore, when the metal ring W having the large diameter is held, the interval between the abutment members 42 increases, and a portion of the metal ring W positioned between the abutment members 42 is substantially linearly deformed. This state does not especially obstruct the polishing, but instead of the abutment member 42 of the present embodiment, as shown in FIG. 8, an abutment member 52 integrally including a first abutment portion 50 which abuts on the inner surface of a small-diameter metal ring W1 and a second abutment portion 51 which abuts on the inner surface of a large-diameter metal ring W2 may also be disposed. Accordingly, the sliding distance of each abutment member 52 toward the peripheral edge side from the central side of the rotation base 32 can be comparatively reduced. When the large-diameter metal ring W is held, the interval between the abutment members 52 is reduced, and the metal ring W can be held in an approximately perfect circle shape.

Figure 9:
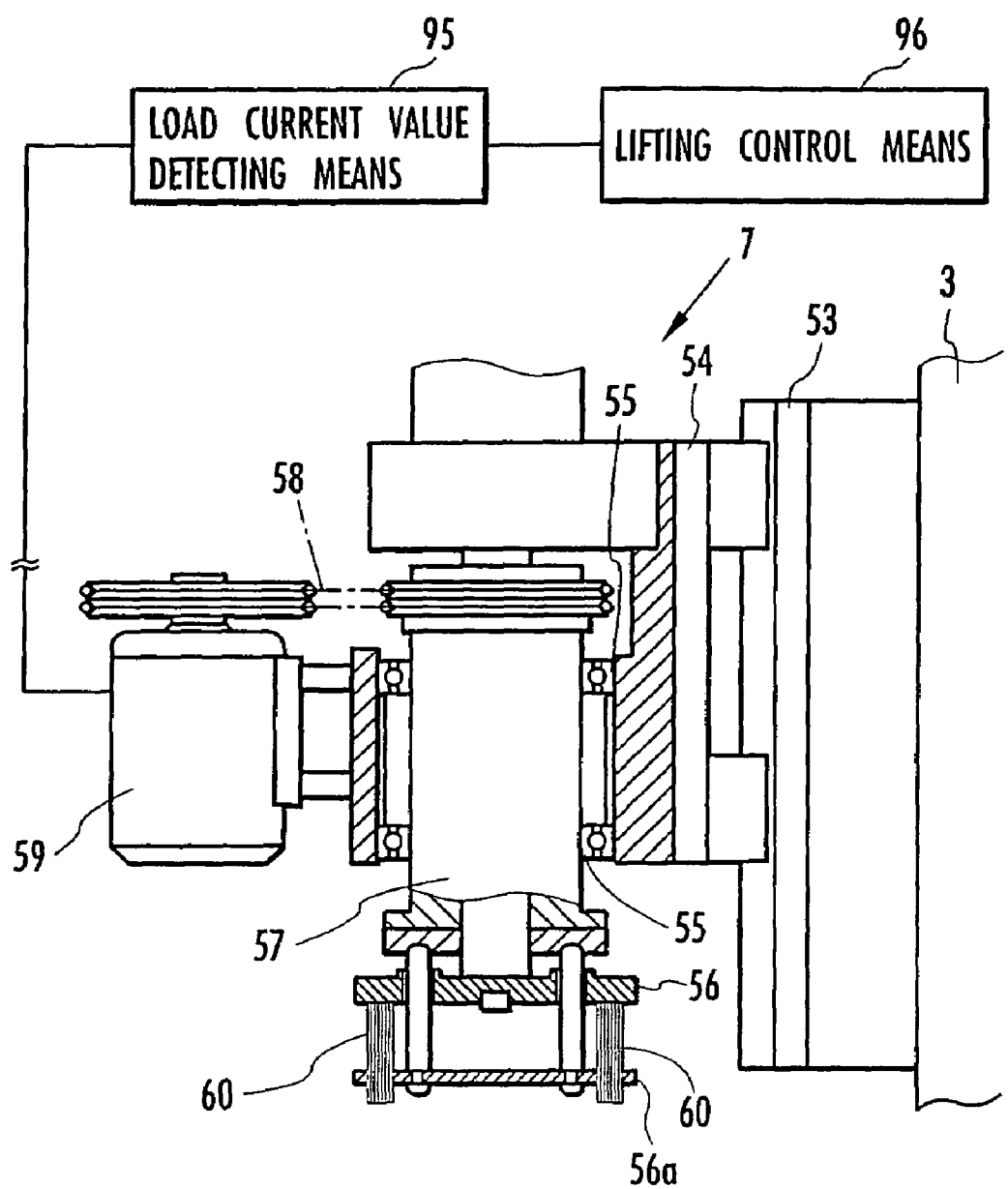
FIG. 9 is an explanatory sectional view showing polishing means.

Next, the first coarse polishing means 7 will be described. The first coarse polishing means 7 is disposed on the first coarse polishing stage B shown in FIG. 2 to polish one edge of each metal ring W held by the holding table 4 stopped on the first coarse polishing stage B. As shown in FIG. 9, the first coarse polishing means 7 includes: a lifting frame 54 capable of moving up/down along a rail 53 disposed on the support 3 upright along the axial line of the turntable 2 (see FIG. 2); a rotating shaft 57 which is rotatably supported by the lifting frame 54 via a plurality of bearings 55 and whose lower end is connected to a brush head 56; and a driving motor 59 for rotating the rotating shaft 57 via a belt 58. The lifting frame 54 is lowered by the lifting means (not shown) at a stop time of the turntable 2, and raised at a rotation time of the motor for rotation 22.

Figure 10:
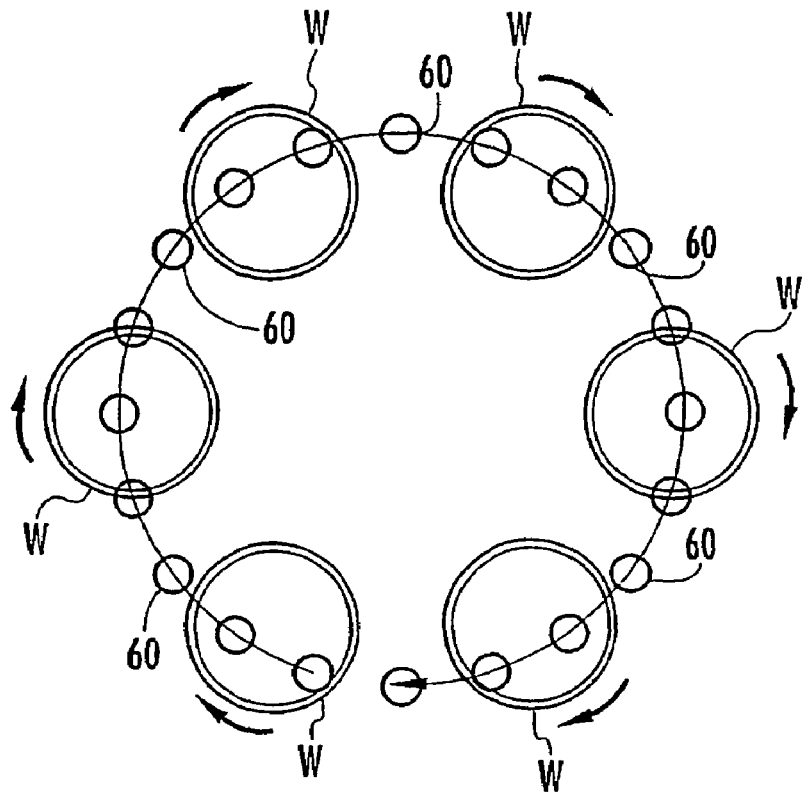
FIG. 10 is an explanatory view schematically showing an operation of a polishing brush.
Figure 11:
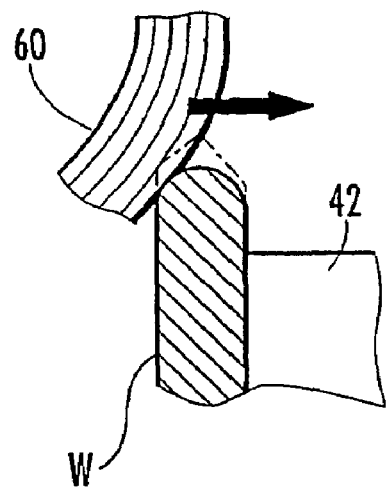
FIG. 11 is an explanatory view showing a polishing state of the metal ring by the polishing brush.

On the brush head 56, polishing brushes 60 each constituted by bunching nylon linear materials containing polishing materials are arranged/held in a circular form. A brush having a small (coarse) count for coarse polishing is used in the polishing brush 60. As shown in FIG. 10, the polishing brushes 60 arranged in the circular form as shown in FIG. 10 rotate have such diameters that the brushes simultaneously abut on the respective metal rings on the holding table 4 when rotating. Moreover, when the brush head 56 shown in FIG. 9 is lowered, as shown in FIG. 10, the polishing brush 60 crosses each metal ring W to abut on one edge of the ring, and one edge of the metal ring W is polished over the whole periphery by the rotations of the polishing brush 60 and metal ring W. At this time, as shown in FIG. 11, the polishing brush 60 rides over one edge of the metal ring W so that one edge of the metal ring W is satisfactorily polished.

It is to be noted that the brush head 56 shown in FIG. 9 may be controlled by the driving motor 59 so as to alternately repeat forward and reverse rotations. Concretely, after rotating the polishing brushes 60 clockwise to polish the metal rings W for a predetermined time, the polishing brushes 60 are rotated counterclockwise and polished for a predetermined time. When the polishing brushes 60 are rotated clockwise and counterclockwise in this manner, the metal rings W can be evenly polished, and moreover the polishing brushes 60 can be prevented from being curled.

Moreover, the first intermediate polishing means 8 and first finish polishing means 9 are different only in the count (fineness) of the polishing brush 60, and the other constitution is similar to that of the first coarse polishing means 7. That is, referring to FIG. 2, the polishing brush 60 of the first intermediate polishing means 8 having a count larger (finer) than that of the polishing brush 60 of the first coarse polishing means 7 is used, and the polishing brush 60 of the first finish polishing means 9 having a count larger (finer) than that of the polishing brush 60 of the first intermediate polishing means 8 is used. In the present embodiment, concretely, it is assumed that the count of the polishing brush 60 of the first coarse polishing means 7 is #46, the count of the polishing brush 60 of the first intermediate polishing means 8 is #120, and the count of the polishing brush 60 of the first finish polishing means 9 is #320.

Figure 12:
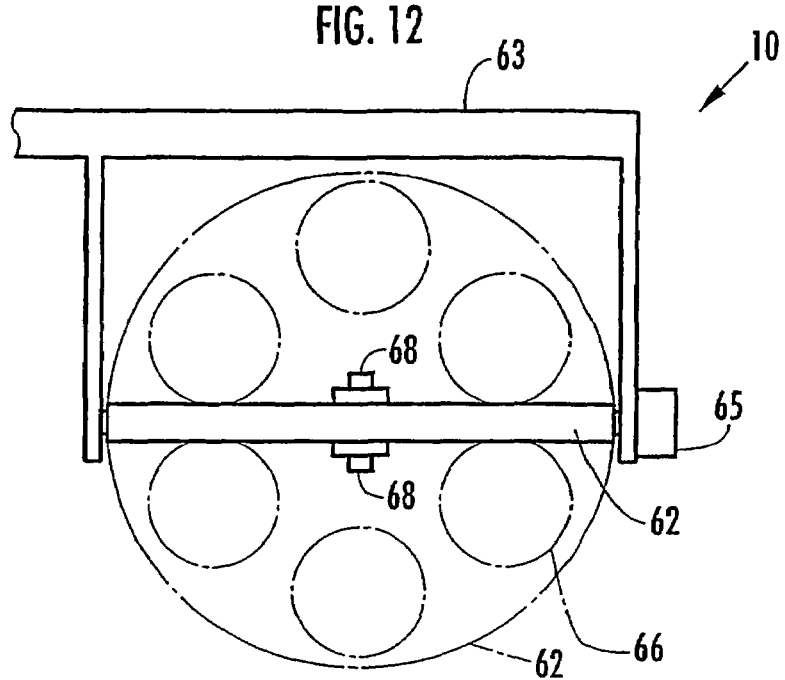
FIG. 12 is an explanatory side view of inverting means.
Figure 13:
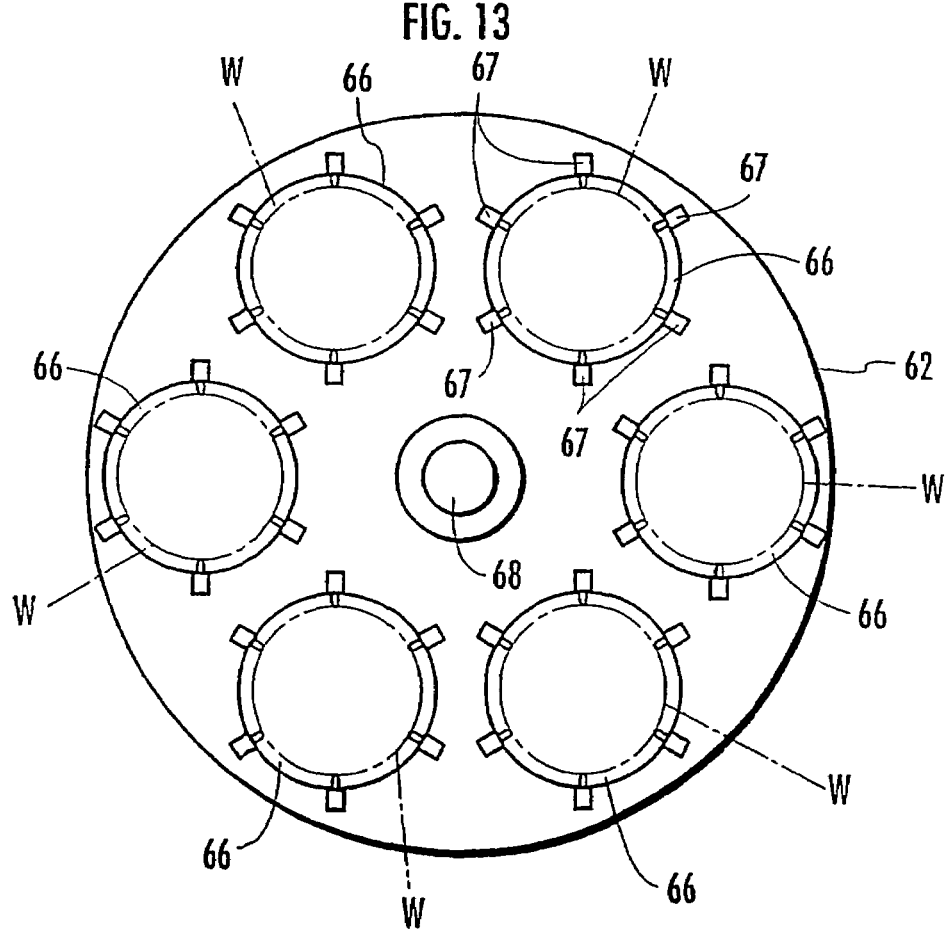
FIG. 13 is an explanatory view showing a holding member for the inverting of the inverting means.

Next, the inverting means 10 will be described. As shown in FIG. 2, the inverting means 10 is disposed on the inverting stage E, detaches and inverts each metal ring W from the holding table 4 positioned on the inverting stage E, and allows the holding table 4 to hold each inverted metal ring W again. That is, the inverting means 10 includes: a holding member for inversion 62 for holding the respective metal rings W on the holding table 4 at once; an inverting arm 63 for supporting the holding member for inversion 62 to invert the metal ring W via the holding member for inversion 62; and arm driving means 64 for driving the inverting arm 63 to rock in the horizontal and vertical directions. As shown in FIG. 12, the inverting arm 63 includes a driving motor for inversion 65 for invertably supporting the disc-shaped holding member for inversion 62 and for inverting the holding member for inversion 62. As shown in FIG. 13, the holding member for inversion 62 includes a plurality of holding holes 66 formed at predetermined intervals on the same circumference. The respective holding holes 66 are disposed in six positions in the present embodiment in accordance with the holding positions of the metal rings W in the holding table 4. Furthermore, the inner diameter of each holding hole 66 is formed to be larger than the outer diameter of the metal ring W. The holding member for inversion 62 also includes a plurality of plungers 67 for the respective holding holes 66. The metal ring W housed in each holding hole 66 is attached to/grasped by each plunger 67 by its outer periphery. Furthermore, pressing protrusions 68 for pressing downwards the second sliding shaft 47 (see FIG. 6) disposed in the holding means 28 of the holding table 4 are disposed on the front/back of a middle portion of the holding member for inversion 62.

Moreover, as shown in FIG. 2, the inverting means 10 is connected to cleaning means 69. The cleaning means 69 includes a support arm 70 connected to the inverting arm 63, and a plurality of cleaning nozzles 71 arranged on the tip of the support arm 70. When the inverting arm 63 of the inverting means 10 rocks in the horizontal direction and the holding member for inversion 62 is moved outwards from above the holding table 4, each cleaning nozzle 71 is opposed onto the holding table 4 to wash away polishing wastes sticking to the holding table 4 from which the metal ring W is removed.

Figure 14:
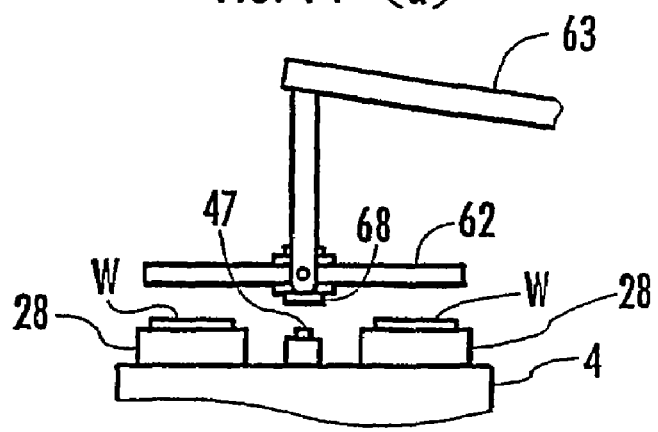
FIG. 14 is an explanatory view showing the operation of the inverting means.
Figure 14:
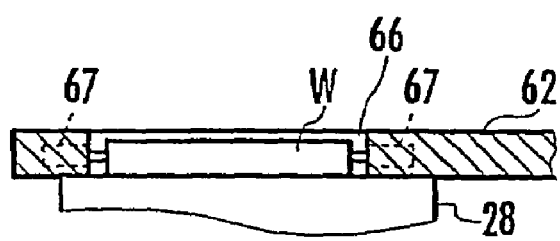
Figure 14:
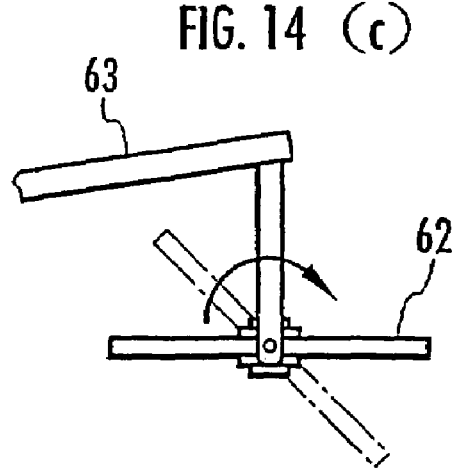

When the metal ring W is inverted by the inverting means 10, as shown in FIG. 14(a), first the holding member for inversion 62 is positioned right above the holding table 4 and lowered by the inverting arm 63. As shown in FIG. 2, since each holding hole 66 of the holding member for inversion 62 is opposite to each metal ring W held on the holding table 4, each metal ring W held on the holding table 4 is housed in each holding hole 66 by the lowering of the holding member for inversion 62. Moreover, since the pressing protrusions 68 of the holding member for inversion 62 press downwards the second sliding shaft 47 in the same manner as in the operation of the holding means 28 by the holding member for projection 16 shown in FIG. 6, each metal ring W held by each holding means 28 is released. Moreover, as shown in FIG. 14(b), the metal ring W is engaged with the plurality of plungers 67 in each holding hole 66 of the holding member for inversion 62, and the metal ring W is held in each holding hole 66.

Next, the holding member for inversion 62 is raised and horizontally moved outwards from above the holding table 4 by the inverting arm 63, as shown in FIG. 14(c), the holding member for inversion 62 is inverted by the driving of the driving motor for inversion 65 shown in FIG. 12. Accordingly, the metal ring W in each holding hole 66 of the holding member for inversion 62 is inverted. During this, as shown in FIG. 2, the holding table 4 on which the metal ring W is not held is cleaned as described above. Moreover, the inverted holding member for inversion 62 is moved and lowered to an upper position of the holding table 4 by the inverting arm 63. Accordingly, each holding means 28 of the holding table 4 holds the metal ring W whose non-polished other edge is exposed upwards. When the holding member for inversion 62 is simply inverted, a plurality of metal rings W can be inverted with remarkably good efficiency.

In the downstream of the inverting means 10, as shown in FIG. 2, the second coarse polishing means 11, second intermediate polishing means 12, and second finish polishing means 13 are disposed. Since these polishing means 11, 12, 13 have constitutions similar to those of the first coarse polishing means 7, first intermediate polishing means 8, and first finish polishing means 9, the description thereof is omitted.

Next, the clearing means 6 will be described. As shown in FIG. 2, the clearing means 6 is constituted by a clearing/transporting conveyor 72 for conveying a plurality of metal rings W in a clearing direction, and transfer means for clearing 73 which holds the metal rings W held on the holding table 4 positioned on the projecting/clearing stage A to transfer the ring to a start end of the clearing/transporting conveyor 72.

The transfer means for clearing 73 includes: a holding member for clearing 74 for holding a plurality of metal rings W in a state opposed to the holding position of the metal ring W of the holding table 4; a transfer arm 75 for moving the holding member for clearing 74 to the clearing/transporting conveyor 72 from the holding table 4 positioned on the projecting/clearing stage A; and arm driving means 76 for driving the transfer arm 75 to rock in the horizontal and vertical directions. It is to be noted that although not shown, the transfer arm 75 includes a constitution for constantly maintaining the holding member for clearing 74 in a horizontal state, even when rocked in the horizontal and vertical directions. The holding member for clearing 74 includes a constitution similar to that of the holding member for projection 16 shown in FIG. 3. It is to be noted that the holding member for clearing 74 is non-rotatably connected to the tip of the transfer arm 75.

Moreover, the clearing means 6 is connected to cleaning means 77. The cleaning means 77 includes a support arm 78 connected to the transfer arm 75, and a plurality of cleaning nozzles 79 disposed on the tip of the support arm 78. Each cleaning nozzle 79 is opposed onto the holding table 4, when the transfer arm 75 of the clearing means 6 rocks in the horizontal direction and the holding member for clearing 74 is moved onto the clearing/transporting conveyor 72 from above the holding table 4, and washes away the polishing wastes sticking to the holding table 4 from which the metal ring W is removed.

In accordance with the polishing device 1 of the present embodiment constituted as described above, as shown in FIG. 2, first the projecting means 5 projects the metal ring W onto the holding table 4 positioned on the projecting/clearing stage A of the turntable 2 (projecting step). Accordingly, the metal ring W is held by the holding table 4 in a state in which one end of the ring is directed upwards. Next, when the holding table 4 holding the metal ring W stops on the first coarse polishing stage B by the intermittent rotation of the turntable 2, the first coarse polishing means 7 coarsely polishes one end of the metal ring W by the polishing brush 60. Similarly, the intermediate polishing is carried out by the polishing brush 60 of the first intermediate polishing means 8 in the first intermediate polishing stage C, and the finish polishing is carried out by the polishing brush 60 of the first finish polishing means 9 in the first finish polishing stage D (first brush polishing step).

Thereafter, when the holding table 4 holding the metal ring W whose one edge has been polished is stopped on the inverting stage E, the inverting means 10 inverts the metal ring W (inverting step). Accordingly, the metal ring W is held by the holding table 4 in a state in which the other end is directed upwards. Subsequently, when the metal ring W on the holding table 4 is conveyed onto the second coarse polishing stage F by the intermittent rotation of the turntable 2, the other end of the metal ring W is coarsely polished by the polishing brush 60 of the second coarse polishing means 11. Similarly, when the metal ring is successively conveyed to the second intermediate polishing stage G and second finish polishing stage H, the brush polishing of the other edge of the metal ring W is completed (second brush polishing step). Moreover, the metal ring W whose opposite edges have been polished is cleared from the turntable 2 by the clearing means 6. In this manner, in accordance with the present embodiment, the brush polishing of the opposite edges of the metal ring W is remarkably efficiently performed. Since the metal rings W do not collide with each other or media do not stick as in the conventional barrel polishing, a high-precision polishing can be performed.

Figure 15:
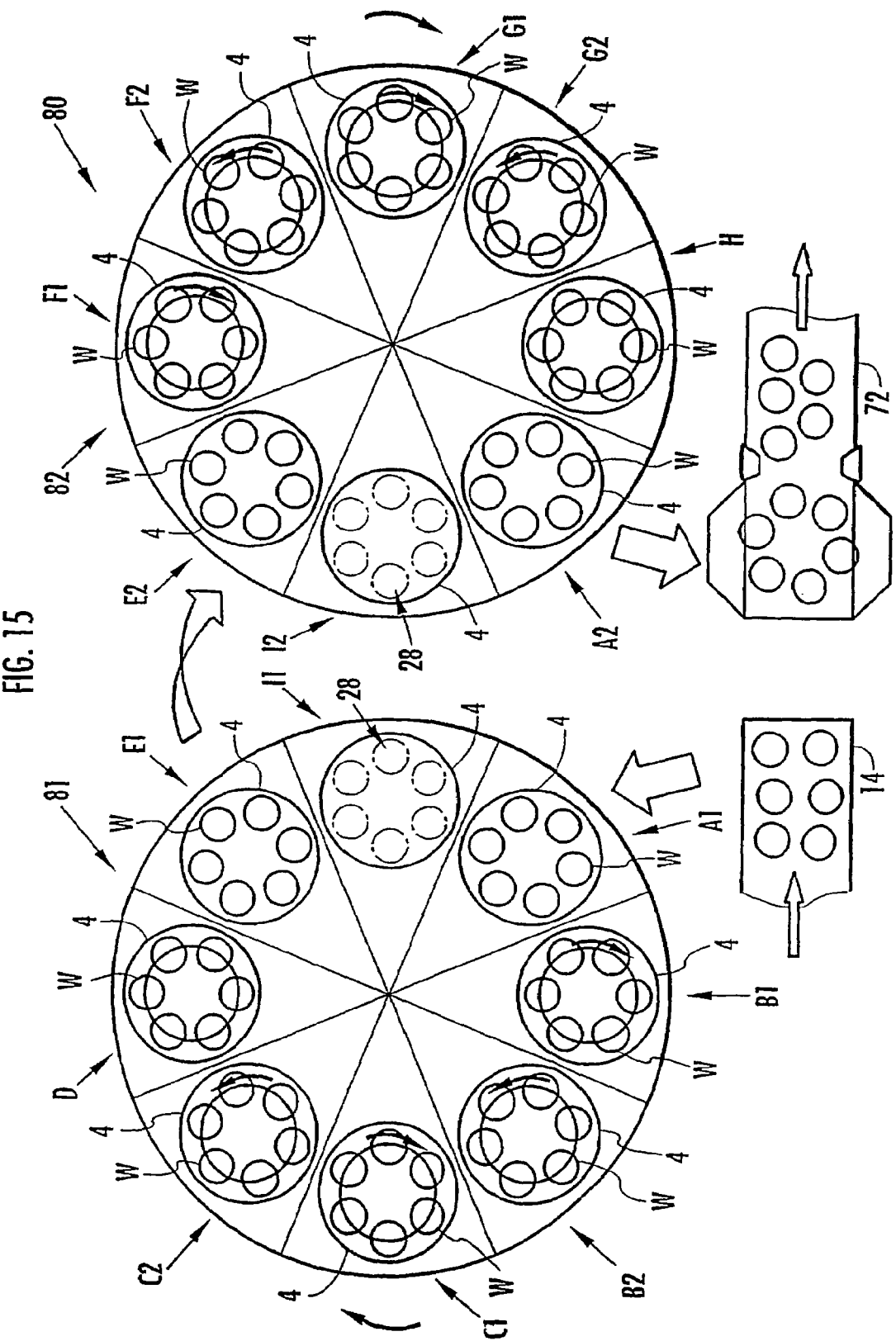
FIG. 15 is an explanatory view schematically showing a polishing device of a second embodiment.

Next, a second embodiment of the present invention will be described with reference to FIG. 15. As shown in FIG. 15, a polishing device 80 of the second embodiment includes a first turntable 81 and a second turntable 82 disposed adjacent to the first turntable 81. The first turntable 81 and second turntable 82 have a constitution similar to that of the turntable 2 of the first embodiment, and the holding table 4 and holding means 28 disposed in the first turntable 81 and second turntable 82 are also constituted in the same manner as in the first embodiment. The other components described in the first embodiment are denoted with the same reference numerals in the drawing to omit the description thereof.

The first brush polishing step of polishing one edge of the metal ring W is performed in the first turntable 81, and the second brush polishing step of polishing the other edge of the metal ring W is performed in the second turntable 82. The first turntable 81 intermittently rotates via eight stages A1, B1, B2, C1, C2, D, E1, I1 which are stop positions. The eight stages A1, B1, B2, C1, C2, D, E1, I1 in the first turntable 81 are the projecting stage A1, brush forward rotation coarse polishing stage B1, brush reverse rotation coarse polishing stage B2, brush forward rotation intermediate polishing stage C1, brush reverse rotation intermediate polishing stage C2, finish polishing stage D, clearing (inverting) stage E1, and cleaning stage I1 in order. It is to be noted that the projecting means is disposed on the projecting stage A1 in the same manner as in the first embodiment although not shown. The first coarse polishing means having the same constitution are respectively disposed on the brush forward rotation coarse polishing stage B1 and brush reverse rotation coarse polishing stage B2. The brush forward rotation intermediate polishing stage C1 and brush reverse rotation intermediate polishing stage C2 have the first intermediate polishing means having the same constitution. Moreover, the finish polishing stage D includes first finish polishing means, and the cleaning stage I1 includes cleaning means.

Similarly, the second turntable 82 also intermittently rotates via eight stages E2, F1, F2, G1, G2, H, A2, I2 which are the stop positions. The eight stages E2, F1, F2, G1, G2, H, A2, I2 in the second turntable 82 are the projecting (inverting) stage E2, brush forward rotation coarse polishing stage F1, brush reverse rotation coarse polishing stage F2, brush forward rotation intermediate polishing stage G1, brush reverse rotation intermediate polishing stage G2, finish polishing stage H, clearing stage A2, and cleaning stage I2 in order. It is to be noted that inverting means is disposed between the clearing stage E1 in the first turntable 81 and the projecting stage E2 in the second turntable 82.

In the brush forward rotation coarse polishing stages B1, F1 and the brush reverse rotation coarse polishing stages B2, F2, the respectively disposed polishing means have the same constitution, but are different with forward/reverse rotation directions of the polishing brush 60. In this manner, an abutment direction of the polishing brush 60 with respect to the metal ring W does not deviate in one direction, and high-precision polishing is possible. In the same manner as in the brush forward rotation intermediate polishing stages C1, G1 and the brush reverse rotation intermediate polishing stages C2, G2, the rotation direction of the polishing brush 60 differs and the ring can be polished with high precision. Since the metal ring W is not held on the holding table 4 in the cleaning stages I1, I2, the holding table 4 can be cleaned to securely remove the polishing wastes.

In this manner, since the first turntable 81 and second turntable 82 are disposed in the polishing device 80 of the second embodiment, a plurality of stages such as the cleaning stages I1, I2 can additionally be disposed, and the metal ring W can be polished with higher precision.

Figure 16:
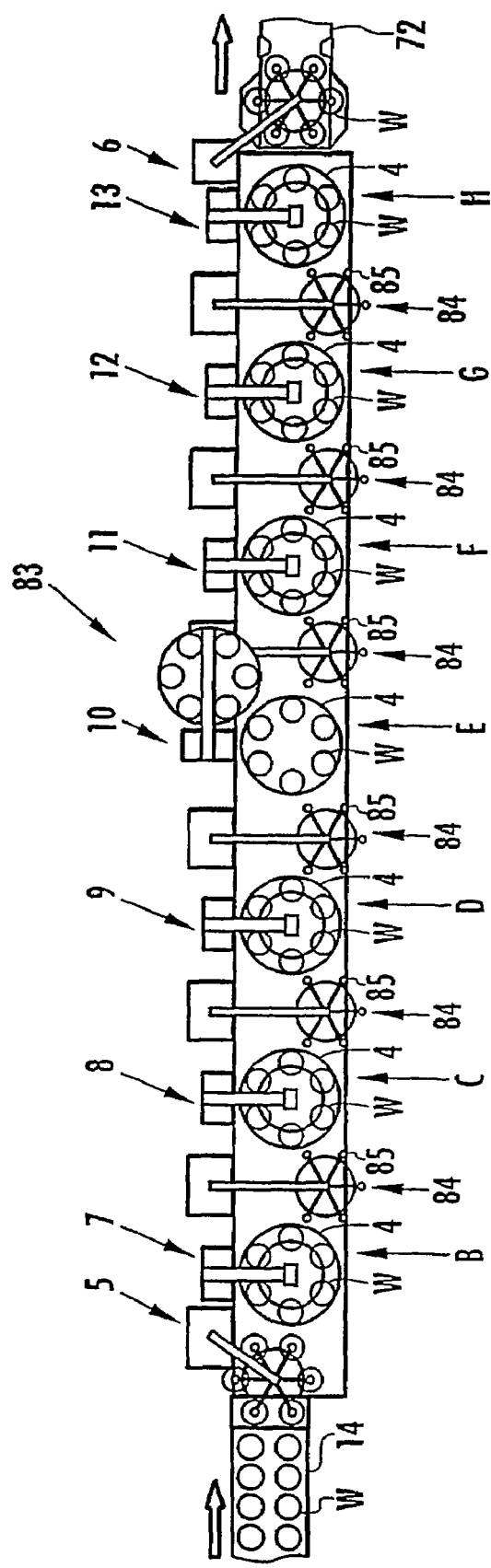
FIG. 16 is an explanatory view schematically showing the polishing device of a third embodiment.

Next, a third embodiment of the present invention will be described with reference to FIG. 16. It is to be noted that the components already described in the first embodiment are denoted with the same reference numerals in FIG. 16 and the description thereof is omitted. In a polishing device 83 of the third embodiment, as shown in FIG. 16, seven stages B to H are substantially linearly arranged without using the turntable 2. The first coarse polishing stage B includes the first coarse polishing means 7, the first intermediate polishing stage C includes the first intermediate polishing means 8, and the first finish polishing stage D includes the first finish polishing means 9. The inverting stage E includes the inverting means 10. Furthermore, the inverting stage E includes the second coarse polishing means 11, the second intermediate polishing stage G includes the second intermediate polishing means 12, and the second finish polishing stage H includes the second finish polishing means 13. Moreover, the holding table 4 and holding means 28 (see FIGS. 5 and 6) having the same constitution as that described in the first embodiment are disposed in each of the stage B to H.

Moreover, transfer means 84 for transferring the metal ring W to the other holding table 4 from one holding table 4 is disposed between the holding table 4 which are disposed adjacent to each other. The projecting/transporting conveyor 14 is disposed on the upstream side of the first coarse polishing stage B, and the projecting means 5 is disposed between the projecting/transporting conveyor 14 and the first coarse polishing stage B. The clearing/transporting conveyor 72 is disposed on the downstream side of the second finish polishing stage H, and the clearing means 6 is disposed between the second finish polishing stage H and clearing/transporting conveyor 72. Each transfer means 84 includes the constitution similar to that of the discharge means 6.

Since the respective stages B to H are substantially linearly arranged in the polishing device 83 of the third embodiment, the necessity of the projecting/clearing stage A such as the turntable 2 of the polishing device 1 of the first embodiment can be obviated. When the transfer means 84 transfers the metal ring W to the other holding table 4 from one holding table 4, the metal ring W is removed from one holding table 4. Therefore, when each transfer means 84 includes cleaning nozzles 85, the cleaning operation of the holding table 4 from which the metal ring W is removed or the polished metal ring W can easily be inserted.

Figure 17:
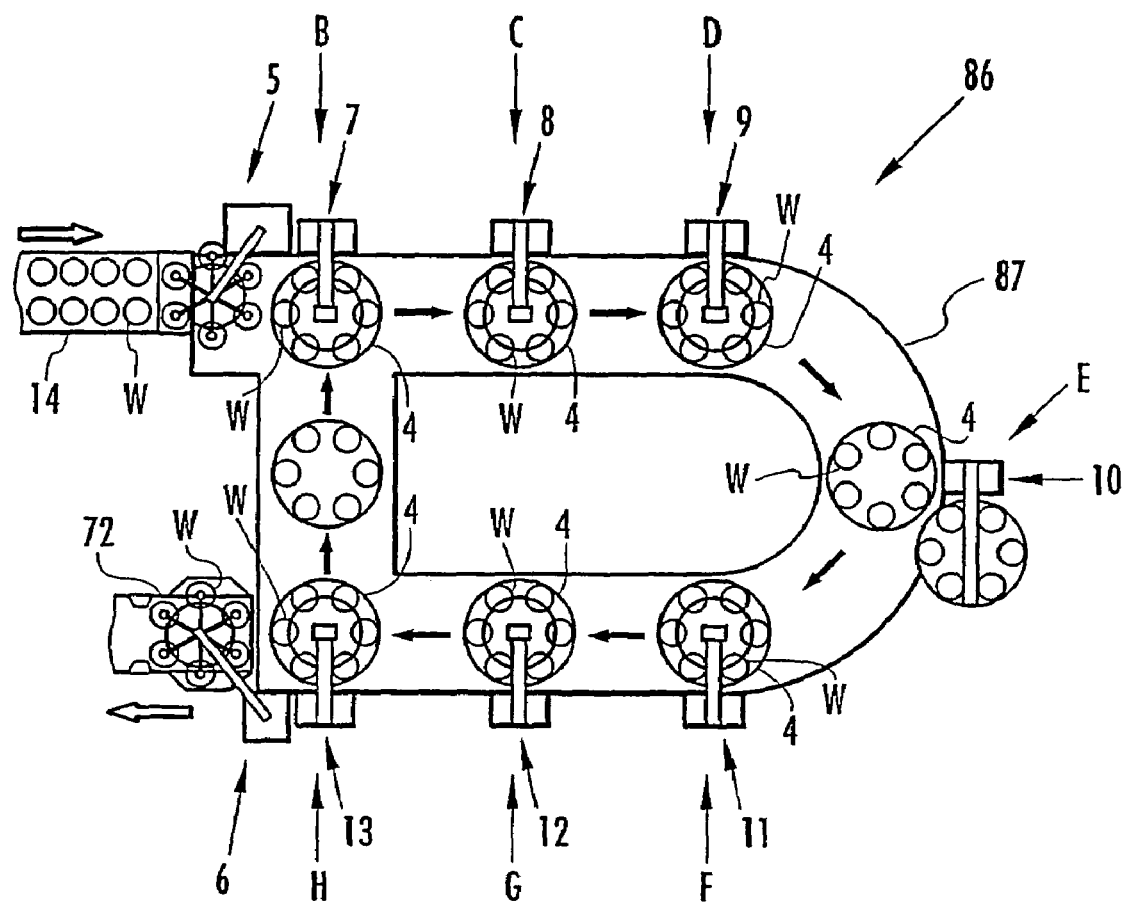
FIG. 17 is an explanatory view schematically showing the polishing device of a fourth embodiment.

Next, a fourth embodiment of the present invention will be described with reference to FIG. 17. It is to be noted that the components already described in the first embodiment are denoted with the same reference numerals in FIG. 17 and the description thereof is omitted. In a polishing device 86 of the fourth embodiment, an endless transporting conveyor 87 is disposed instead of the turntable 2, and the operation is similar to that of the turntable 2. That is, the transporting conveyor 87 intermittently transports a plurality of holding tables 4 at predetermined intervals along a substantially elliptic track. In the fourth embodiment, the respective stages B, C, D in which the first brush polishing step is performed are arranged in parallel with the stages F, G, H in which the second brush polishing step is performed, and the inverting stage E is disposed in a return position between the first finish polishing stage D and the second coarse polishing stage F. This obviates the necessity of the respective transfer means 84 such as the polishing device 83 of the third embodiment, and the device constitution can be simplified. It is to be noted that in the polishing device 86 of the fourth embodiment, as shown in FIG. 17, the holding table 4 which does not hold the metal ring W is transferred between the second finish polishing stage H and the first coarse polishing stage B. At this time, although not shown, the holding table 4 can be cleaned.

It is to be noted that in the above-described respective embodiments, the first brush polishing means is constituted of the first coarse polishing means 7, first intermediate polishing means 8, and first finish polishing means 9, and the second brush polishing means is constituted of the second coarse polishing means 11, second intermediate polishing means 12, and second finish polishing means 13, but the present invention is not limited to these. For example, the first brush polishing means may be constituted of the first coarse polishing means 7 and first finish polishing means 9, and the second brush polishing means may also be constituted of the second coarse polishing means 11 and second finish polishing means 13.

Figure 18:
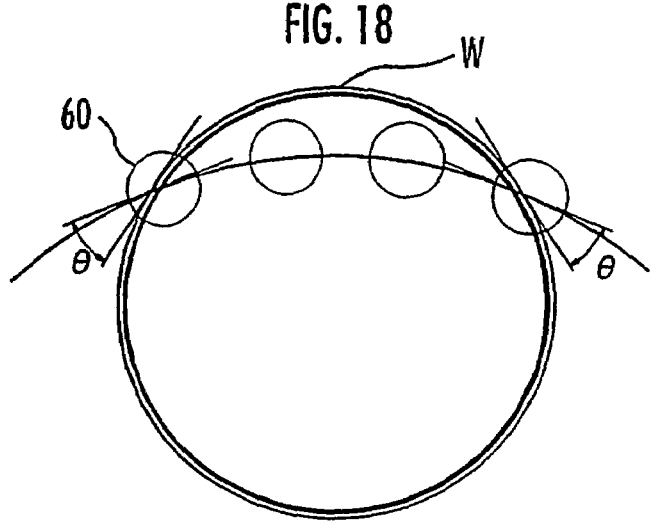
FIG. 18 is an explanatory view showing a relation between tracks of the metal ring and polishing brush.

Moreover, as described above with reference to FIG. 10, the polishing brush 60 crosses and abuts on each metal ring W, and by the rotations of the polishing brush 60 and metal ring W, one edge of the metal ring W is polished over the whole periphery. At this time, both an incidence angle and an outgoing angle of the polishing brush 60 with respect to the metal ring W are preferably set to 20° to 45°, and exactly in the above-described embodiments, as shown in FIG. 18, the incidence angle θ and outgoing angle θ are set to about 36°.

Figure 19:
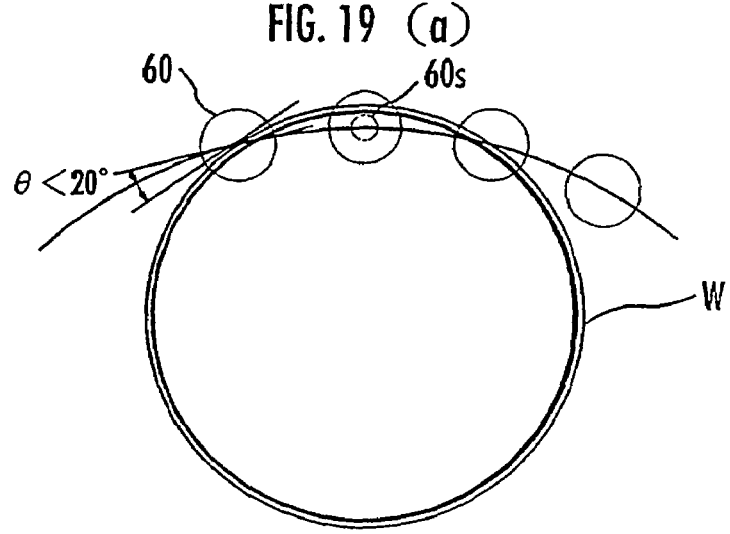
FIG. 19 is an explanatory view showing the relation between the tracks of the metal ring and polishing brush.
Figure 19:
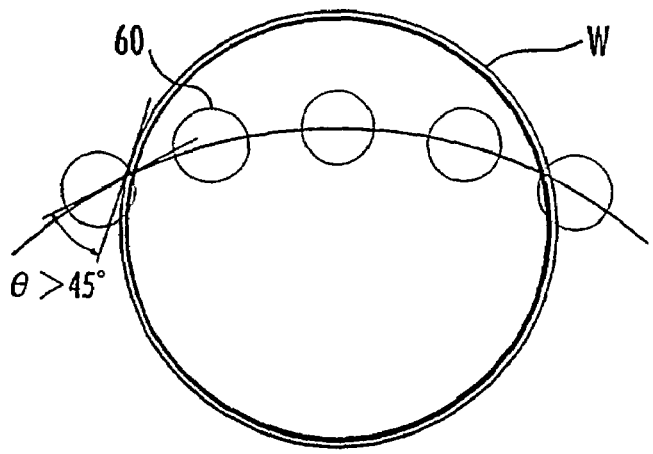

Here, a case in which the incidence angle θ and outgoing angle θ of the polishing brush 60 with respect to the metal ring W are less than 20° and exceed 45° will be described with reference to FIGS. 19(a) and 19(b). When the incidence angle θ and outgoing angle θ of the polishing brush 60 with respect to the metal ring W are less than 20° as shown in FIG. 19(a), the metal ring W does not abut on the whole polishing brush 60, and the edge of the metal ring W is insufficiently polished. Additionally, since the metal ring W enters the polishing brush 60, and the polishing brush 60 also abuts on both the inner and outer peripheral surfaces of the metal ring W, there is a possibility that the inner and outer peripheral surfaces of the metal ring W are damaged. Moreover, to avoid this situation, as shown by a virtual line in FIG. 19(a), a polishing brush 60s with a small outer diameter has to be used. However, the polishing brush 60s having a small outer diameter has a large deflection amount, and there is a possibility that the polishing is insufficient.

On the other hand, when the incidence angle θ and outgoing angle θ of the polishing brush 60 with respect to the metal ring W exceed 45° as shown in FIG. 19(b), a time of abutment on the metal ring W by the polishing brush 60 is remarkably small, and the polishing is insufficient all in all. For this reason, the incidence angle θ and outgoing angle θ of the polishing brush 60 with respect to the metal ring W are preferably set to 20° to 45°, and are set to about 36° in the above-described embodiments.

Figure 20:
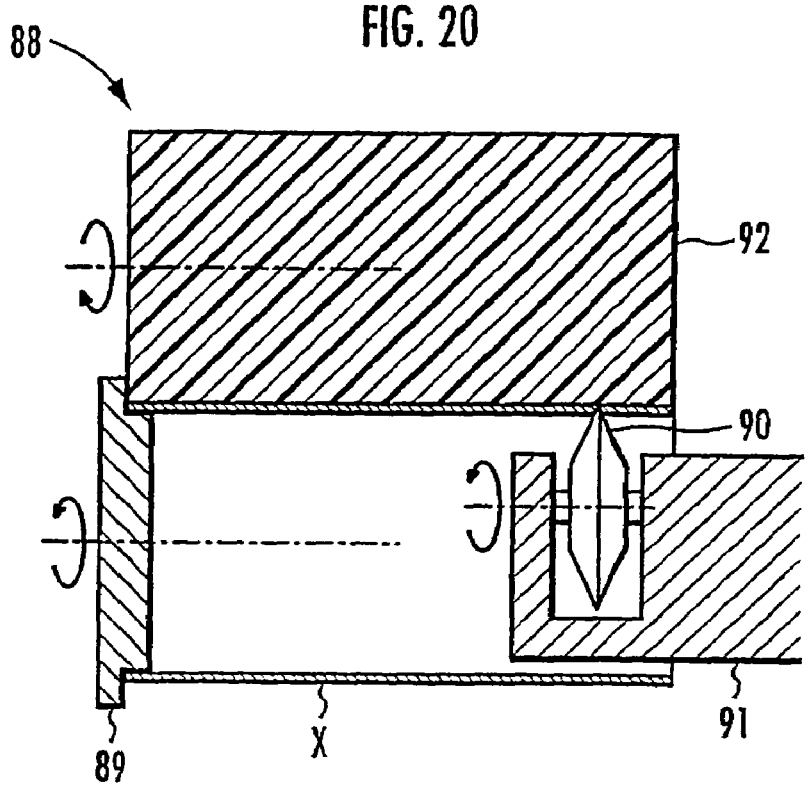
FIG. 20 is an explanatory view showing a cut-out step of the metal ring from a metal drum.

Furthermore, in the above-described embodiments, the shape of the edge of the metal ring W before the polishing is chamfered beforehand in order to more efficiently polish the metal ring W. That is, in each embodiment, as shown in FIG. 20, a cutting device 88 is used in such a manner that the cut edge of the metal ring W has a chamfered shape during the cutting-out of the metal ring W from a metal drum X. As schematically shown in FIG. 20, the cutting device 88 includes: a holding member 89 for holding the metal drum X in a cylindrical form; a disc-shaped cutter 90 whose blade surface has a crow's foot shape; a cutter holding section 91 for rotatably holding the cutter 90; and a receiving roller 92 which abuts on the outer peripheral surface of the metal drum X to rotate with the rotation of the metal drum X. The receiving roller 92 is formed of a synthetic resin having elasticity, and presses the metal drum X from an outer peripheral side during the pushing/cutting of the metal drum X by the cutter 90 from the inner peripheral side.

Figure 21:
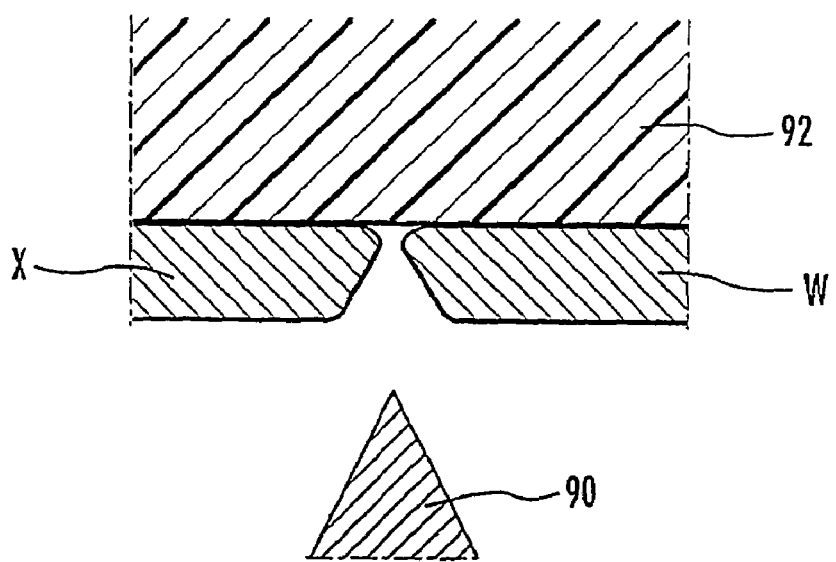
FIG. 21 is an explanatory view showing a cut edge in a state in which the metal ring is cut out.

Moreover, as shown in FIGS. 20 and 21, the metal ring W is cut from the metal drum X by the cutter 90. Concretely, as shown in FIG. 20, while the metal drum X attached to the holding member 89 is rotated, the cutter 90 is pressed onto the inner peripheral surface of the metal drum X by the cutter holding section 91. At this time, as shown in FIG. 21, the outer peripheral surface of the metal drum X onto which the cutter 90 is pressed is held by the receiving roller 92. Since the receiving roller 92 is formed of the synthetic resin having elasticity, the metal drum X pushed upwards by the cutter 90 is deflected on a receiving roller 92 side and pushed/cut by the cutter 90. Accordingly, as shown in FIG. 21, the metal ring W whose cut edge has a chamfered shape can be obtained. It is to be noted that in the present embodiment, an example in which the cutter 90 is pressed onto the inner peripheral surface of the metal drum X has been described, but in another example, although not shown, the metal drum X is held on the inner peripheral surface side, the cutter is pressed onto the metal drum X from the outer peripheral surface side, and the metal ring W is cut. Even in this case, the chamfered cut edge can be formed.

Figure 22:
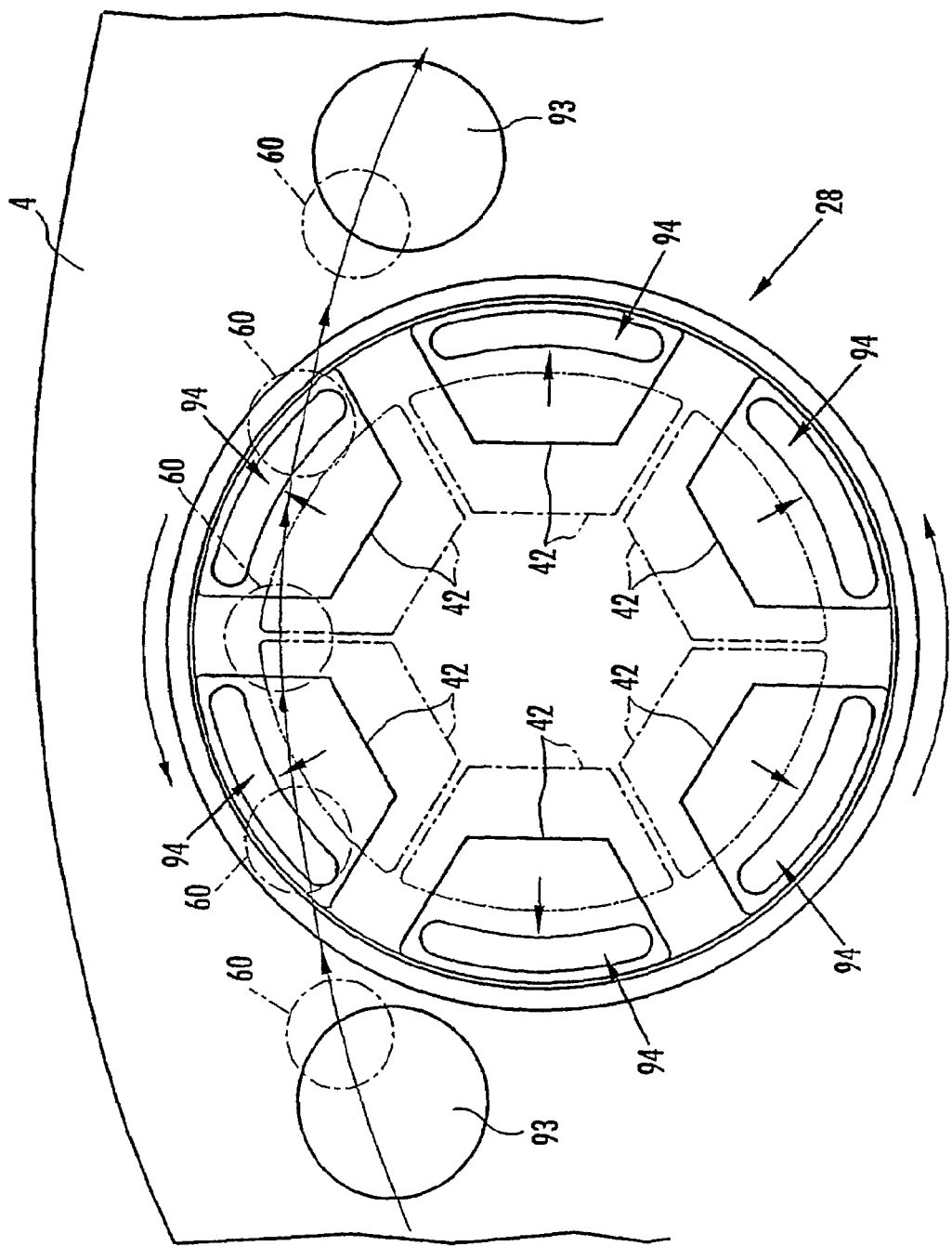
FIG. 22 is an explanatory view schematically showing the operation of the holding table and polishing brush.

Moreover, in the above-described embodiments, as shown in FIG. 22, a first dressing portion 93 can be disposed between the holding means 28 on the holding table 4. A plurality of first dressing portions 93 are disposed along the track of the polishing brush 60, and formed by grinding stones which abut on the tip of the rotated polishing brush 60.

Furthermore, a second dressing portion 94 can be disposed on the upper surface of each abutment member 42 of each holding means 28. The second dressing portion 94 is formed by bonding the grinding stone to the upper surface of each abutment member 42. Since the holding means 28 rotates, the second dressing portion 94 disposed on the upper surface of each abutment member 42 also rotates. Accordingly, although not shown, even when the elongated second dressing portion 94 is disposed in the vicinity of the inside of the metal ring W of each abutment member 42, the rotating second dressing portion 94 surely crosses the track of the polishing brush 60 and abuts on the polishing brush 60.

Figure 23:
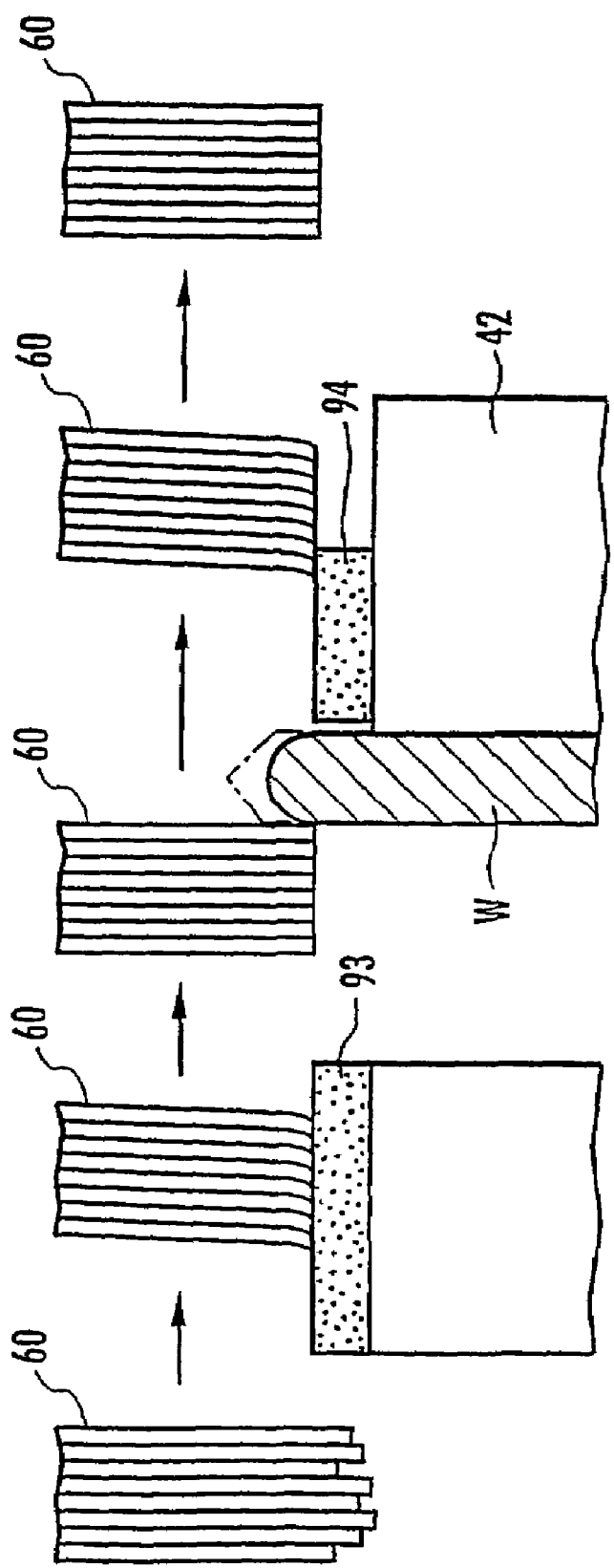
FIG. 23 is an explanatory view showing dressing of the polishing brush at a polishing time of the metal ring.

As shown in FIGS. 22 and 23, the rotated polishing brush 60 contacts the first dressing portion 93 disposed in the track. When the bristles of the polishing brush 60 are not aligned, the bristles are shaved and arranged by the first dressing portion 93.

Furthermore, as shown in FIGS. 22 and 23, the rotating polishing brush 60 abuts on the second dressing portion 94 disposed on each abutment member 42 of the holding means 28 which rotates while holding the metal ring W. When the second dressing portion 94 rotates integrally with each abutment member 42 and together with the metal ring W, the portion crosses the track of the polishing brush 60 to abut on the polishing brush 60. At this time, since the second dressing portion 94 rotates and abuts on the polishing brush 60, friction between the second dressing portion 94 and the polishing brush 60 is large, and the second dressing portion 94 can securely arrange the bristles of the polishing brush 60 with good efficiency in a short time in which the portion passes on the holding means 28.

When the first dressing portion 93 or the second dressing portion 94 is disposed in this manner, the polishing brush 60 polishes the metal ring W, and simultaneously the dressing is performed to arrange the bristles of the polishing brush 60. Therefore, maintenance operations such as the dressing operation and replacement while removing the polishing brush 60 can be eased, the bristles of the polishing brush 60 are aligned, the bristles uniformly abut on the metal ring W, and polishing precision can be enhanced.

It is to be noted that, needless to say, the bristles of the polishing brush 60 can sufficiently be aligned, even when either one of the first dressing portion 93 and the second dressing portion 94 is disposed.

Moreover, the first coarse polishing means 7 of the first embodiment in FIG. 9 will be described as the example. As schematically shown in FIG. 9, load current value detecting means 95 for detecting the load current value of the driving motor 59, and lifting control means 96 for controlling the lifting means in accordance with the current value detected by the load current value detecting means 95 are arranged in the polishing means 7. The operations of the load current value detecting means 95 and lifting control means 96 will be described hereinafter.

Figure 24:
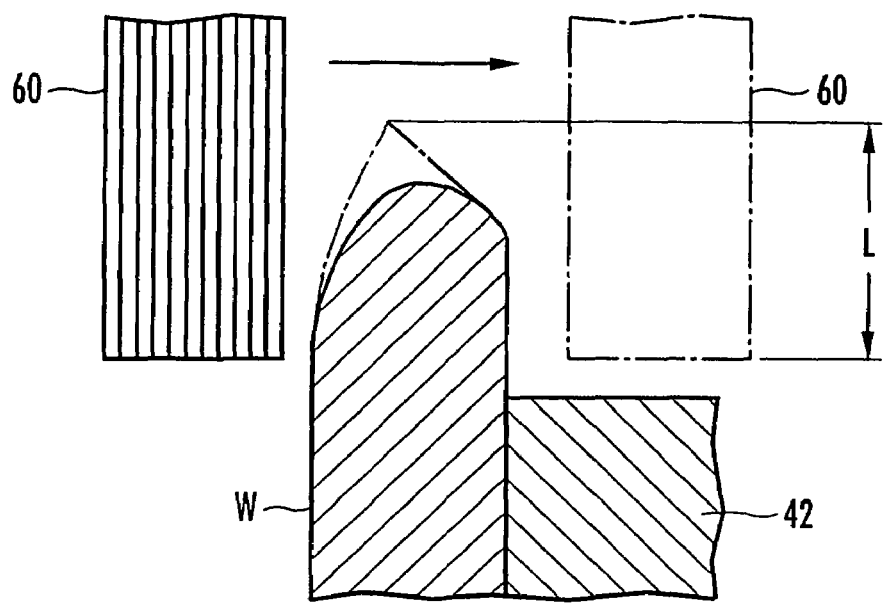
FIG. 24 is an explanatory view showing a polishing state of the metal ring by the polishing brush.

In the polishing of the metal ring W, as described above, after six metal rings W are attached to each holding means 28 of the holding table 4, each holding means 28 is rotated, and each metal ring W accordingly rotates. At this time, the brush head 56 is rotated by driving the motor 59 (see FIG. 9). Moreover, when the polishing means 7 is lowered, and the polishing brush 60 has a predetermined cut-in amount with respect to the metal ring W, the polishing means 7 is fixed. Accordingly, as shown in FIG. 24, the polishing brush 60 abuts on one side edge of the metal ring W, the polishing brush 60 rides over one edge of the metal ring W, and one edge of the metal ring W is polished.

Additionally, when the metal ring W is polished, the load current value of the motor 59 changes in accordance with the wear of the polishing brush 60. Since the change of the load current value is detected by the load current value detecting means 95, the lifting control means 96 lowers the brush head 56 via the lifting means so that the detected load current value is a load current value in a predetermined range, and accordingly the cut-in amount is controlled so as to be constant. It is to be noted that a component shown by a reference numeral 56a in FIG. 9 is a support plate which supports a tip portion of the polishing brush 60. When a predetermined protruding amount of the polishing brush 60 protruding downwards from the support plate 56a is set, an appropriate rigidity and processing force are imparted to the polishing brush 60. Moreover, to polish the metal ring W, the brush head 56 is lowered so that the protruding amount of the polishing brush 60 is constant in accordance with the wear of the polishing brush 60. Therefore, the cut-in amount into the metal ring W by the polishing brush 60 is set to be constant.

Here, the operation of the load current value detecting means 95 and lifting control means 96 will be described in further detail. The load current value detecting means 95 calculates a difference between a current value (first current value) measured at a time when the polishing brush 60 is in a non-contact state with respect to the metal ring W (idling time) and a current value (second current value) measured at a time when the polishing brush 60 is brought in the contact state with respect to the metal ring W (polishing time) to detect the load current value.

Figure 25:
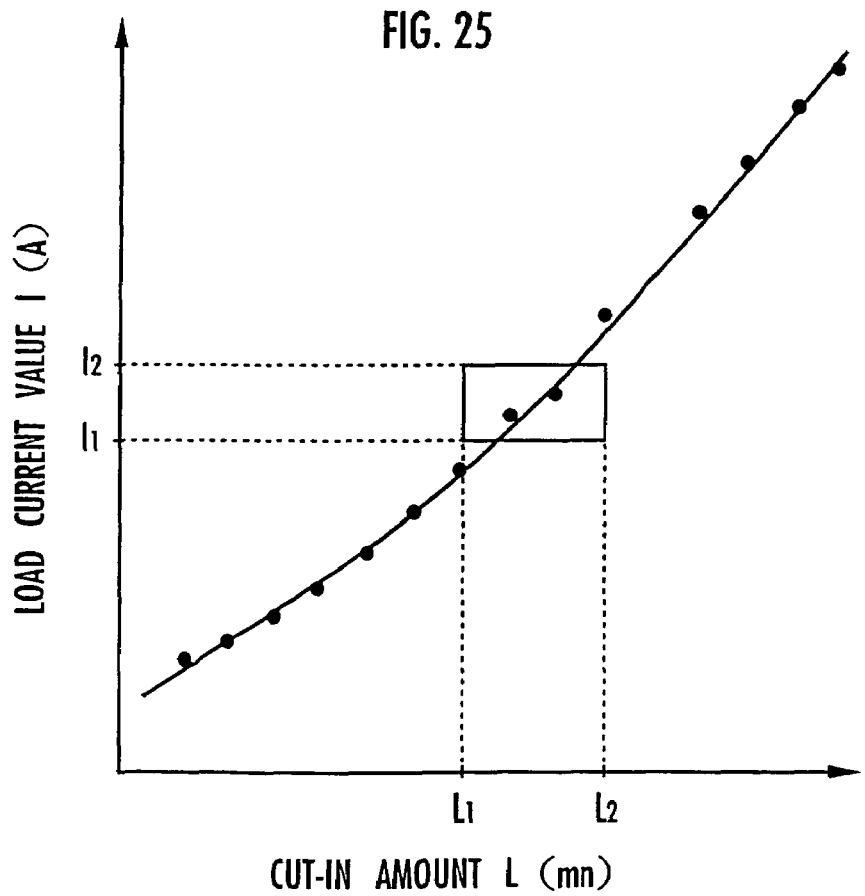
FIG. 25 is a graph showing a relation between a cut-in amount of the polishing brush and a load current value of a motor.

On the other hand, the lifting control means 96 stores the range of the load current value in accordance with a satisfactory polishing amount based on a correlation between the load current value and polishing amount calculated beforehand. That is, when the polishing brush 60 rotates, abuts on the side edge of the metal ring W and performs the polishing, a load is applied to the motor 59 of the polishing brush 60. The load applied to the motor 59 is detected as the load current value of the motor 59 by the load current value detecting means 95. At this time, as shown in FIG. 25, when a cut-in amount L of the polishing brush 60 into the metal ring W is large, a load current value I of the motor 59 is also large. When the cut-in amount L is small, the load current value I is also small.

Figure 26:
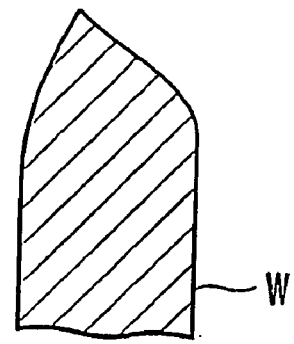
FIG. 26 is an explanatory view showing a polishing amount in accordance with the cut-in amount.
Figure 26:
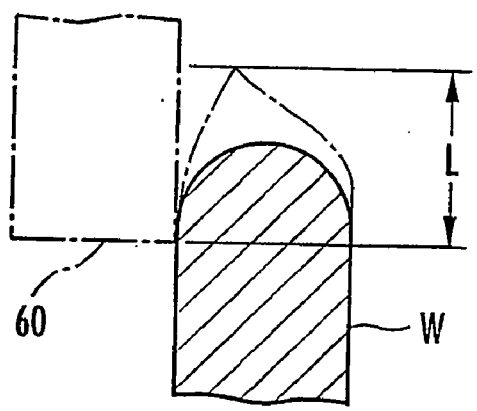
Figure 26:
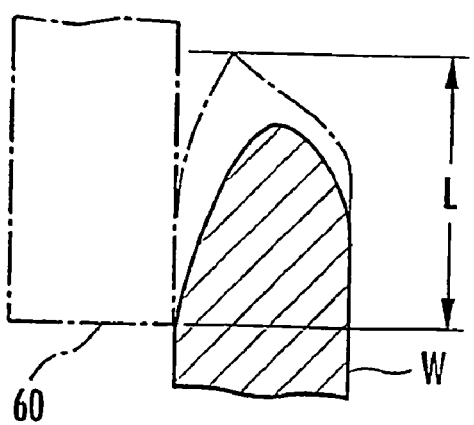

Moreover, FIG. 26(*a*) shows the shape of the side edge of the metal ring W (before the polishing/processing) immediately after the ring is cut from the cylindrical metal drum. As shown in FIG. 26(*b*), when the cut-in amount L of the polishing brush 60 into the metal ring W is set to be small and the polishing is performed, the polishing amount is small, and the side edge of the metal ring W is polished in a comparatively large curved shape whose tip radius is comparatively large. As shown in FIG. 26(*c*), the cut-in amount L of the polishing brush 60 into the metal ring W is set to be large and the polishing is performed, the polishing amount becomes large, and the side edge of the metal ring W is polished in a curved shape whose tip radius is comparatively small. From this, the cut-in amount L necessary for polishing the side edge into a satisfactory curved shape can be obtained. Moreover, a range $I_1$ to $I_2$ of the load current value I can be obtained from a relation between the cut-in amount L and the load current value I shown in FIG. 25 so as to obtain a satisfactory range $L_1$ to $L_2$ of the cut-in amount L.

The lifting control means 96 monitors whether or not the load current value detected by the load current value detecting means 95 is in the predetermined range $I_1$ to $I_2$ (range of the load current value corresponding to the satisfactory polishing amount). When the load current value is larger than the range upper limit $I_2$, the brush head 56 is raised, and the cut-in amount L is decreased. When the load current value is smaller than the range lower limit $I_2$, the brush head 56 is lowered to increase the cut-in amount L.

Accordingly, concretely, even when the polishing brush 60 is worn and the cut-in amount L is small, the brush head 56 is lowered to increase the cut-in amount L, and the satisfactory polishing amount can be maintained. That is, when the polishing brush 60 is worn, as shown in FIG. 26(*b*), the cut-in amount L is small, and the load current value of the motor 59 of the polishing brush 60 drops. The load current value at this time is detected by the load current value detecting means 95, and sent to the lifting control means 96. Since the lifting control means 96 lowers the brush head 56 in accordance with the drop of the load current value, the cut-in amount L increases, and the satisfactory polishing amount can be obtained as shown in FIG. 24.

It is to be noted that the lowering limit position of the brush head 56 is set in the lifting control means 96. Moreover, to increase the cut-in amount L in accordance with the load current value detected by the load current value detecting means 95, when the lowering limit position of the brush head 56 is exceeded in a case in which the polishing brush 60 is remarkably worn, it can be easily judged that the polishing brushes 60 are excessively worn and that polishing abilities of the polishing brushes 60 excessively drop and that it is a time to change the brushes.

INDUSTRIAL APPLICABILITY

In the present invention, since a side edge of a metal ring can be polished with a high precision by a polishing brush, it is possible to use the present invention in polishing a thin plate cylindrical metal ring for use in an endless belt of a continuously variable transmission.

The invention claimed is:

1. A method of polishing a thin-plate cylindrical metal ring for use in an endless belt of a continuously variable transmission, comprising: a projecting step of projecting the metal ring; a first brush polishing step of polishing one edge of the metal ring projected in the projecting step by a polishing brush; an inverting step of inverting the metal ring whose one edge is polished in the first brush polishing step; a second brush polishing step of polishing the other edge of the metal ring inverted in the inverting step by the polishing brush; and a clearing step of clearing the metal ring whose other edge is polished by the second brush polishing step; wherein the first and second brush polishing steps comprise the steps of: holding the metal ring substantially in a circular shape to rotate the ring in a circumferential direction; further allowing the polishing brush formed in an annular shape having a diameter larger than that of the metal ring to be rotated to abut on the metal ring so as to cross the edge of the rotating metal ring, and the polishing brush enters the metal ring at an incidence angle in a range of 20° to 45° with respect to a track of the rotating metal ring and passes between an inner peripheral surface of the metal ring and a rotation center of the metal ring and leaves the metal ring at an outgoing angle in a range of 20° to 45° with respect to the track of the metal ring, when the polishing brush crosses the edge of the rotating metal ring.

2. The method according to claim 1, wherein the metal ring projected in the projecting step is formed by cutting out a thin-plate cylindrical metal drum into round slices by a cut-out step disposed before the projecting step, and the cut-out step comprises the step of: at least either one of pushing or cutting the metal drum with a cutter whose blade surface has a crow's foot shape.

3. The method according to claim 1, wherein the first and second brush polishing steps comprises the steps of: detecting a load current value of a motor for rotating the polishing brush, when the polishing brush abuts on the metal ring; and increasing or decreasing a cut-in amount of the polishing brush into the metal ring so that the detected load current value is a load current value in a predetermined range.

4. The method according to claim 3, prior to the first and second brush polishing steps, further comprising: a step of measuring a first current value of the motor, when the polishing brush is in a non-abutting state with respect to metal ring and the polishing brush is rotated; a step of measuring the polishing amount and a second current value of the motor, when the polishing brush abuts on the metal ring to polish the edge of the metal ring; a step of setting an increase of the second current value with respect to the first current value as the load current value to calculate a correlation between the load current value and the polishing amount; and a step of setting the load current value in the predetermined range in each brush polishing step based on the calculated correlation between the load current value and polishing amount.

5. An device for polishing a thin-plate cylindrical metal ring for use in an endless belt of a continuously variable transmission, comprising: a holding table for detachably holding the metal ring while one edge of the ring is exposed; projecting means for projecting the metal ring into the holding table; first polishing means for polishing one edge of the metal ring held by the holding table by a polishing brush; inverting means for inverting the metal ring whose one edge is polished by the first polishing means and allowing the holding table to hold the metal ring while the other edge of the ring is exposed; second polishing means for polishing the other edge of the metal ring inverted by the inverting means and held by the holding table by the polishing brush; and clearing means for clearing the metal ring whose other edge is polished by the second polishing means from the holding table; wherein the holding table includes holding means for detachably holding the metal ring to rotate the metal ring in its peripheral direction, each the first and second polishing means includes the polishing brush formed in the annular shape having a diameter larger than that of the metal ring to rotate, and the polishing brush is allowed to abut on the metal ring so as to cross the edge of the metal ring rotated by the holding means and form a curved shape on the edge of the metal ring.

6. The polishing device according to claim 5, wherein the holding table includes a plurality of the holding means arranged at predetermined intervals on the same circumference, and the polishing brush is formed in such a diameter that the polishing brush simultaneously abuts on the respective metal rings held by the holding means on the holding table.

7. The polishing device according to claim 6, wherein a plurality of the holding tables are arranged at predetermined intervals around a rotation axis of a turntable which intermittently rotates every predetermined angle, and the projecting means, the first polishing means, the inverting means, the second polishing means and the clearing means are successively arranged toward downstream from upstream along a rotation track of each holding table rotated by the turntable.

8. The polishing device o according to claim 5, further comprising: a first turntable including a plurality of holding tables arranged at the predetermined intervals around the rotation axis and intermittently rotating every predetermined angle; and a second turntable disposed adjacent to the first turntable and including a plurality of holding tables at the predetermined intervals around the rotation axis to intermittently rotate every predetermined angle, wherein the projecting means and the first polishing means are successively arranged toward downstream from upstream along the rotation track of each holding table rotated by the first turntable, the second polishing means and the clearing means are successively arranged toward downstream from upstream along the rotation track of each holding table rotated by the second turntable, and the inverting means inverts the metal ring on the holding table positioned in the downstream of the first polishing means of the first turntable to transfer the metal ring onto the holding table positioned in the upstream of the first polishing means of the second turntable.

9. The polishing device according to claim 5, wherein each of the projecting means, the first polishing means, the inverting means, the second polishing means and the clearing means includes the holding table, and transfer means is disposed between the holding tables disposed adjacent to each other to transfer the metal ring to the other holding table from one holding table.

10. The polishing device according to claim 9, wherein the projecting means, the first polishing means, the inverting means, the second polishing means and the clearing means are substantially linearly arranged.

11. The polishing device according to claim 5, wherein the holding table is circulated along an endless transfer path for intermittent transfer every predetermined distance, and the projecting means, the first polishing means, the inverting means, the second polishing means and the clearing means are successively arranged toward downstream from upstream of each stop position of the holding table transferred by the transfer path.

12. The polishing device according to claim 5, wherein each of the first and second polishing means comprises: coarse polishing means for polishing the ring by a comparatively largely meshed polishing brush for rough processing; intermediate polishing means for polishing the ring by a polishing brush for intermediate processing finer than that for coarse processing subsequently to the polishing by the coarse polishing means; and finish polishing means for polishing the ring by a polishing brush for finish processing finer than that for intermediate processing subsequently to the polishing by the intermediate polishing means.

13. The polishing device according to claim 5, wherein the holding table is capable of holding a plurality of metal rings, and the projecting means comprises: a transfer path for transferring the plurality of metal rings; an ascendible and descendible rise/fall table which is disposed on a terminal end of the transfer path and on which a forefront metal ring transferred along the transfer path is laid; a rotatable disc-shaped holding member disposed so as to be movable between the rise/fall table and the holding table while holding the plurality of metal rings; a predetermined number of housing sections which are arranged around the rotation axis of the holding member in accordance with a holding position of each metal ring of the holding table and which are formed in a diameter larger than that of the metal ring to house the metal ring; rise/fall means for lifting up the rise/fall table to house the metal ring in the housing section, when the holding member is positioned above the rise/fall table and any of the housing sections of the holding member is opposed to the metal ring on the rise/fall table; pressure contact holding means which is disposed in each housing section to pressure-contact an outer peripheral wall of the metal ring housed in the housing section and which holds the metal ring in the housing section and which releases the pressure contact onto the outer peripheral wall of the metal ring in the holding position of the holding table; rotating means for rotating the holding member so as to dispose the non-housing housing section opposite to the metal ring on the rise/fall table after holding the metal ring in the housing section; and moving means for moving the holding member to the holding table from the rise/fall table after holding the metal ring in each housing section of the holding member.

14. The polishing device according to claim 13, wherein an even number of housing sections are disposed in the holding member in accordance with the holding position of each metal ring of the holding table, and one pair of metal rings are laid on positions corresponding to any pair of housing sections of the holding member in the rise/fall table.

15. The polishing device according to claim 5, wherein the holding table comprises holding means for detachably holding the metal ring to rotate the metal ring in the peripheral direction, the holding means comprises: a laying base on which the metal ring is laid; a plurality of rails formed on the laying base to extend toward the inner surface of the metal ring from an axial center side of the metal ring laid on the laying base; a plurality of abutment members which are slidably disposed along each rail and which are capable of abutting on the inner surface of the metal ring laid on the laying base; and abutment member driving means for sliding the respective abutment members along the respective rails to attach or detach each abutment member with respect to the inner surface of the metal ring, and the abutment member driving means comprises: a moving member capable of moving in a vertical direction along an axial center of the metal ring laid on the laying base; link means for connecting the moving member to each abutment member to attach each abutment member to the inner surface of the metal ring when the moving member moves upwards and to detach each abutment member from the inner surface of the metal ring when the moving member moves downwards; urging means for urging the moving member upwards to attach each abutment member to the inner peripheral surface of the metal ring via the link means by an urging force; and holding release means for moving the moving member downwards against the urging force of the urging means to detach each abutment member from the inner peripheral surface of the metal ring via the link means.

16. The polishing device according to claim 15, wherein a plurality of laying bases are arranged on the same circumference, the holding release means comprises: another moving member disposed in a central position of the arrangement circumference of each laying base so as to be movable in the vertical direction; a connecting member for connecting the other moving member to the moving member of each laying base; and means for moving downwards simultaneously the moving member of each laying base by the downward movement of the other moving member to detach simultaneously each abutment member of each laying base from the inner peripheral surface of the metal ring.

17. The polishing device according to claim 5, wherein the inverting device comprises: a ring holding member which releasably holds the metal ring polished by the first polishing means and which is movable to a predetermined position; and moving means for inverting and moving the ring holding member holding the metal ring to the predetermined position, the ring holding member comprises: a ring holding hole which extends through an axial direction of the metal ring in accordance with an outer diameter of the metal ring and which houses the metal ring inside and which releasably holds the metal ring, and the metal ring is inserted via one opening and detached via the other opening of the ring holding hole.

18. The polishing device of the metal ring for the endless belt of the continuously variable transmission according to claim 17 wherein the ring holding hole is formed in a diameter larger than that of the metal ring, and pressure contact holding means for pressure-contacting the outer peripheral wall of the metal ring housed in the ring holding hole to releasably hold the metal ring.

19. The polishing device according to claim 17, wherein the first and second polishing means hold a plurality of the metal rings in a predetermined arranged state to polish each metal ring, and the ring holding member comprises a plurality of ring holding holes in accordance with the arranged position of each metal ring of the first and second polishing means.

20. The polishing device of the metal ring for the endless belt of the continuously variable transmission according to claim 5, further comprising: a dressing section for arranging bristles of the polishing brush on the holding table positioned on the track of the polishing brush.

21. The polishing device of the metal ring for the endless belt of the continuously variable transmission according to claim 5, further comprising; a dressing section for arranging the bristles of the polishing brush in an abutment position on the polishing brush in the holding means of the holding table.

* * * * *